US012801870B2

(12) United States Patent
Elshafie et al.

(10) Patent No.: US 12,801,870 B2
(45) Date of Patent: Nov. 17, 2026

(54) INTERFERENCE REDUCTION TECHNIQUES BETWEEN PASSIVE WIRELESS DEVICES

(71) Applicant: QUALCOMM INCORPORATED, San Diego, CA (US)

(72) Inventors: Ahmed Elshafie, San Diego, CA (US); Yu Zhang, San Diego, CA (US); Huilin Xu, Temecula, CA (US); Zhikun Wu, Beijing (CN); Yuchul Kim, San Diego, CA (US); Seyedkianoush Hosseini, San Diego, CA (US); Linhai He, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/866,035

(22) PCT Filed: Jul. 20, 2022

(86) PCT No.: PCT/CN2022/106626

§ 371 (c)(1),
(2) Date: Nov. 14, 2024

(87) PCT Pub. No.: WO2024/016197

PCT Pub. Date: Jan. 25, 2024

(65) Prior Publication Data

US 2025/0307575 A1 Oct. 2, 2025

(51) Int. Cl.
*G06K 7/10* (2006.01)

(52) U.S. Cl.
CPC ..... *G06K 7/10019* (2013.01); *G06K 7/10128* (2013.01)

(58) Field of Classification Search
CPC ........... G06K 7/10019; G06K 7/10128; G06K 7/10029; G06K 7/10118; G06K 7/10009
(Continued)

(56) References Cited

U.S. PATENT DOCUMENTS

| | | | | |
|---|---|---|---|---|
| 8,503,938 | B2 | 8/2013 | Laroia et al. | |
| 9,020,546 | B2 * | 4/2015 | Bucknell | H04W 16/14 455/501 |

(Continued)

FOREIGN PATENT DOCUMENTS

| | | | |
|---|---|---|---|
| CN | 1553867 | A | 12/2004 |
| CN | 105706114 | A | 6/2016 |

(Continued)

OTHER PUBLICATIONS

International Search Report and Written Opinion—PCT/CN2022/106626—ISA/EPO—Jan. 3, 2023 (2201590WO1).

(Continued)

*Primary Examiner* — Nam V Nguyen
(74) *Attorney, Agent, or Firm* — Holland & Hart LLP/Qualcomm

(57) ABSTRACT

This disclosure provides systems, methods and apparatus, including computer programs encoded on computer storage media, for interference reduction techniques between passive wireless devices. In some aspects, a source device, a reader device, or a passive wireless device may support one or more interference avoidance mechanisms according to which the reader device may experience less interference from other devices within a system or may more accurately decode messaging that is meant for the reader device from the radio frequency signaling received at an antenna of the reader device, or both. In some implementations, multiple passive wireless devices may each add or apply a respective communications signature to a reflected or backscattered
(Continued)

signal from that passive wireless device. The respective communications signatures may uniquely identify backscattered signaling from a specific passive wireless device such that a reader device may parse through received signaling and extract and decode a relevant message.

20 Claims, 11 Drawing Sheets

(58) Field of Classification Search
USPC .......................................... 340/10.1 TO, 10.5
See application file for complete search history.

(56) References Cited

U.S. PATENT DOCUMENTS

| | | | | |
|---|---|---|---|---|
| 9,026,064 | B2 * | 5/2015 | Wang | H04B 1/109<br>330/49 |
| 9,251,455 | B2 * | 2/2016 | Lin | G06K 19/0717 |
| 9,397,522 | B2 * | 7/2016 | Chemishkian | H02J 50/001 |
| 9,693,364 | B2 * | 6/2017 | Gale | H04B 1/1036 |
| 10,121,029 | B2 * | 11/2018 | Rabb | H04W 4/30 |
| 10,599,888 | B2 * | 3/2020 | Lin | G06K 19/0717 |
| 11,025,464 | B1 * | 6/2021 | Chen | H04B 1/525 |
| 11,797,813 | B1 * | 10/2023 | Ensworth | G06K 19/0723 |
| 2007/0126586 | A1 * | 6/2007 | Ohtaka | G06K 19/07749<br>343/750 |
| 2007/0222560 | A1 | 9/2007 | Posamentier | |
| 2014/0084060 | A1 * | 3/2014 | Jain | G06Q 10/087<br>235/385 |
| 2021/0279433 | A1 | 9/2021 | Kan et al. | |
| 2021/0319193 | A1 | 10/2021 | Elabd et al. | |

FOREIGN PATENT DOCUMENTS

| | | | |
|---|---|---|---|
| EP | 4395373 | A1 | 7/2024 |
| JP | 2009512357 | A | 3/2009 |
| WO | WO-2007047503 | | 4/2007 |
| WO | WO-2019108940 | A1 | 6/2019 |

OTHER PUBLICATIONS

Hui X., et al., "Code Division Multiple Access in Centimeter Accuracy Harmonic RFID Locating System", IEEE Journal of Radio Frequency Identification IEEE, vol. 1, No. 1, Mar. 1, 2017, pp. 51-58, XP011673765, p. 2, paragraph C. Multi-Tag Localization—p. 4; figures 4, 5.
Supplementary European Search Report—EP22951475—Search Authority—Munich—Apr. 2, 2026 (2201590EP).
Huawei, et al., "Updated Views on Passive IoT", 3GPP TSG RAN meeting #93-e, RP-212135, Electronic Meeting, Sep. 13, 2021-Sep. 17, 2021, Sep. 17, 2021, 7 Pages, Sep. 6, 2021, Para[2.3.3] [1][Fig 2 and 3].

* cited by examiner

INTERFERENCE REDUCTION TECHNIQUES BETWEEN PASSIVE WIRELESS DEVICES

CROSS REFERENCE

The present Application is a 371 national stage filing of International PCT Application No. PCT/CN2022/106626 by Elshafie et al. entitled "INTERFERENCE REDUCTION TECHNIQUES BETWEEN PASSIVE WIRELESS DEVICES," filed Jul. 20, 2022, which is assigned to the assignee hereof, and which is expressly incorporated by reference in its entirety herein.

TECHNICAL FIELD

This disclosure relates to wireless communications, including interference reduction techniques between passive wireless devices.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-s-OFDM). A wireless multiple-access communications system may include one or more base stations (BSs) or one or more network access nodes, each simultaneously supporting communication for multiple communication devices, which may be otherwise known as user equipment (UE).

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communications at a passive wireless device. The method may include receiving an indication of a communications signature, from a set of communications signatures, that is specific to backscattered communications from a source device to a reader device via the passive wireless device, where the communications signature is associated with interference avoidance for the backscattered communications, receiving a first message from the source device, and transmitting, to the reader device, a second message via a backscattering of the first message and in accordance with the communications signature.

Another innovative aspect of the subject matter described in this disclosure can be implemented in an apparatus for wireless communications at a passive wireless device. The apparatus may include one or more interfaces and a processing system. The one or more interfaces may be configured to obtain an indication of a communications signature, from a set of communications signatures, that is specific to backscattered communications from a source device to a reader device via the passive wireless device, where the communications signature is associated with interference avoidance for the backscattered communications, obtain a first message from the source device, and output, to the reader device, a second message via a backscattering of the first message and in accordance with the communications signature.

Another innovative aspect of the subject matter described in this disclosure can be implemented in an apparatus for wireless communications at a passive wireless device. The apparatus may include a processor, memory coupled with the processor, and instructions stored in the memory. The instructions may be executable by the processor to cause the apparatus to receive an indication of a communications signature, from a set of communications signatures, that is specific to backscattered communications from a source device to a reader device via the passive wireless device, where the communications signature is associated with interference avoidance for the backscattered communications, receive a first message from the source device, and transmit, to the reader device, a second message via a backscattering of the first message and in accordance with the communications signature.

Another innovative aspect of the subject matter described in this disclosure can be implemented in another apparatus for wireless communications at a passive wireless device. The apparatus may include means for receiving an indication of a communications signature, from a set of communications signatures, that is specific to backscattered communications from a source device to a reader device via the passive wireless device, where the communications signature is associated with interference avoidance for the backscattered communications, means for receiving a first message from the source device, and means for transmitting, to the reader device, a second message via a backscattering of the first message and in accordance with the communications signature.

Another innovative aspect of the subject matter described in this disclosure can be implemented in a non-transitory computer-readable medium storing code for wireless communications at a passive wireless device. The code may include instructions executable by a processor to receive an indication of a communications signature, from a set of communications signatures, that is specific to backscattered communications from a source device to a reader device via the passive wireless device, where the communications signature is associated with interference avoidance for the backscattered communications, receive a first message from the source device, and transmit, to the reader device, a second message via a backscattering of the first message and in accordance with the communications signature.

Another innovative aspect of the subject matter described in this disclosure can be implemented in a method for wireless communications at a reader device. The method may include receiving an indication of a communications signature, from a set of communications signatures, that is specific to backscattered communications from a source device to the reader device via a passive wireless device, where the communications signature is associated with interference avoidance for the backscattered communications, and receiving, via a backscattering from the passive wireless device, a message in accordance with the communications signature.

Another innovative aspect of the subject matter described in this disclosure can be implemented in an apparatus for wireless communications at a reader device. The apparatus may include an interface and a processing system. The one or more interfaces may be configured to obtain an indication of a communications signature, from a set of communications signatures, that is specific to backscattered communications from a source device to the reader device via a passive wireless device, where the communications signature is associated with interference avoidance for the backscattered communications, and obtain, via a backscattering from the passive wireless device, a message in accordance with the communications signature.

Another innovative aspect of the subject matter described in this disclosure can be implemented in an apparatus for wireless communications at a reader device. The apparatus may include a processor, memory coupled with the processor, and instructions stored in the memory. The instructions may be executable by the processor to cause the apparatus to receive an indication of a communications signature, from a set of communications signatures, that is specific to backscattered communications from a source device to the reader device via a passive wireless device, where the communications signature is associated with interference avoidance for the backscattered communications, and receive, via a backscattering from the passive wireless device, a message in accordance with the communications signature.

Another innovative aspect of the subject matter described in this disclosure can be implemented in another apparatus for wireless communications at a reader device. The apparatus may include means for receiving an indication of a communications signature, from a set of communications signatures, that is specific to backscattered communications from a source device to the reader device via a passive wireless device, where the communications signature is associated with interference avoidance for the backscattered communications, and means for receiving, via a backscattering from the passive wireless device, a message in accordance with the communications signature.

Another innovative aspect of the subject matter described in this disclosure can be implemented in a non-transitory computer-readable medium storing code for wireless communications at a reader device. The code may include instructions executable by a processor to receive an indication of a communications signature, from a set of communications signatures, that is specific to backscattered communications from a source device to the reader device via a passive wireless device, where the communications signature is associated with interference avoidance for the backscattered communications, and receive, via a backscattering from the passive wireless device, a message in accordance with the communications signature.

Another innovative aspect of the subject matter described in this disclosure can be implemented in a method for wireless communications at a source device. The method may include transmitting an indication of a communications signature, from a set of communications signatures, that is specific to backscattered communications from the source device to a reader device via a passive wireless device, where the communications signature is associated with interference avoidance for the backscattered communications, and transmitting, to the reader device via a backscattering from the passive wireless device, a message in accordance with the communications signature.

Another innovative aspect of the subject matter described in this disclosure can be implemented in an apparatus for wireless communications at a source device. The apparatus may include one or more interfaces and a processing system. The one or more interfaces may be configured to output an indication of a communications signature, from a set of communications signatures, that is specific to backscattered communications from the source device to a reader device via a passive wireless device, where the communications signature is associated with interference avoidance for the backscattered communications, and output, to the reader device via a backscattering from the passive wireless device, a message in accordance with the communications signature Another innovative aspect of the subject matter described in this disclosure can be implemented in an apparatus for wireless communications at a source device. The apparatus may include a processor, memory coupled with the processor, and instructions stored in the memory. The instructions may be executable by the processor to cause the apparatus to transmit an indication of a communications signature, from a set of communications signatures, that is specific to backscattered communications from the source device to a reader device via a passive wireless device, where the communications signature is associated with interference avoidance for the backscattered communications, and transmit, to the reader device via a backscattering from the passive wireless device, a message in accordance with the communications signature.

Another innovative aspect of the subject matter described in this disclosure can be implemented in another apparatus for wireless communications at a source device. The apparatus may include means for transmitting an indication of a communications signature, from a set of communications signatures, that is specific to backscattered communications from the source device to a reader device via a passive wireless device, where the communications signature is associated with interference avoidance for the backscattered communications, and means for transmitting, to the reader device via a backscattering from the passive wireless device, a message in accordance with the communications signature.

Another innovative aspect of the subject matter described in this disclosure can be implemented in a non-transitory computer-readable medium storing code for wireless communications at a source device. The code may include instructions executable by a processor to transmit an indication of a communications signature, from a set of communications signatures, that is specific to backscattered communications from the source device to a reader device via a passive wireless device, where the communications signature is associated with interference avoidance for the backscattered communications, and transmit, to the reader device via a backscattering from the passive wireless device, a message in accordance with the communications signature.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
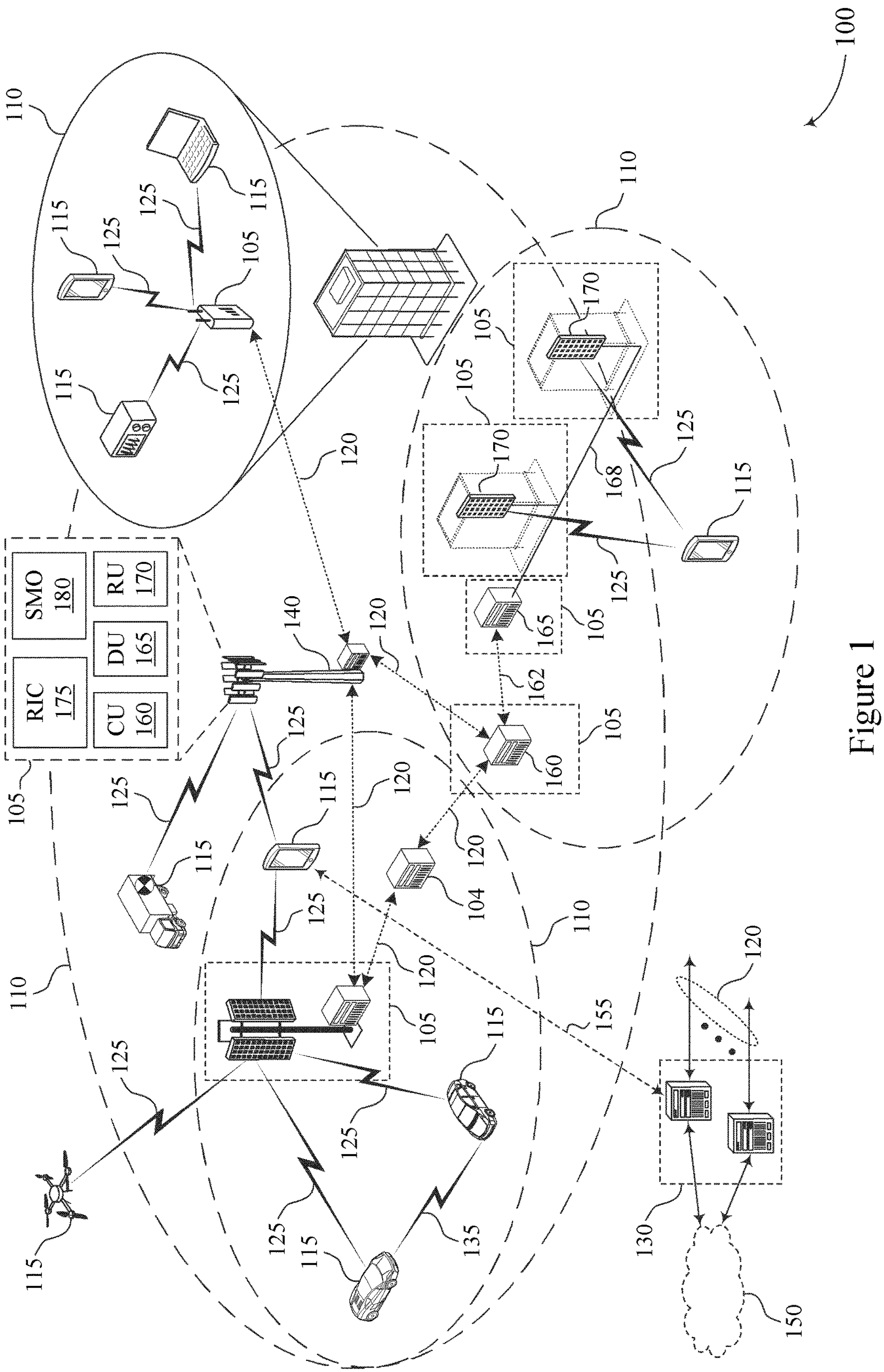
FIG. 1 shows an example wireless communications system that supports interference reduction techniques between passive wireless devices.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system, or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing third generation (3G), fourth generation (4G), fifth generation (5G), or sixth generation (6G), or further implementations thereof, technology.

In some wireless communications systems, a source device may transmit signaling to a reader device via a passive wireless device, which may be referred to or understood as a reflective device or a backscatter device. A wireless tag in an internet of things (IoT) deployment may be an example of such a passive wireless device. The passive wireless device may modulate information on the signaling received from the source device such that the reader device receives information from both the source device and the passive wireless device. For example, the passive wireless device may modulate information with the signaling from the source device in accordance with turning reflection ON to transmit or convey a first bit (such as a "1" bit) and in accordance with switching reflection OFF to transmit or convey a second bit (such as a "0" bit). In some systems, source devices, reader devices, or passive wireless devices may be deployed densely and may experience relatively high levels of interference. For example, backscattered communications between different pairs of source and reader devices that use a same sub-channel or nearby sub-channels may interfere with each other, as some reflected signaling may leak across sub-channels. Reader devices may suffer from a lower likelihood of successful decoding due to such interference.

In some implementations, a source device, a reader device, or a passive wireless device may support one or more configuration- or signaling-based interference avoidance mechanisms according to which the reader device may experience less interference from other devices within a system or may more accurately decode relevant messaging from radio frequency signaling received at an antenna of the reader device, or both. For example, in some deployments, each passive wireless device in the system may add or otherwise apply a respective communications signature to a reflected or backscattered signal from that passive wireless device, where such communications signatures may include time domain code sequences or power scaling factors that uniquely identify which passive wireless device backscattered associated signaling. Additionally, or alternatively, a source device may transmit an indication of a bandwidth over which a passive wireless device is to backscatter signaling and the passive wireless device may filter out any radio frequency energy received outside of the indicated bandwidth. Additionally, or alternatively, a source device and a reader device may support a power control configuration according to which the source device uses a specific transmit power for backscattered communications if another device is simultaneously using a same sub-channel. Further, a source device and a reader device may support a mapping relationship between which sub-channels are occupied and which sub-channels are available (such that an input of occupied sub-channels into the mapping relationship outputs an indication of which sub-channels can be used). As such, a reader device may extract signaling that is relevant or meant for the reader in accordance with decoding using an indicated or expected time domain code sequence, performing successive cancellation associated with an indicated or expected power scaling factor, or receiving backscattered communications using a sub-channel of a set of available sub-channels.

Particular implementations of the subject matter described in this disclosure can be implemented to realize one or more of the following potential advantages. For example, as a result of supporting interference avoidance in deployments associated with backscattered communications from one or more passive wireless device in accordance with a backscatter-specific communications signature or a backscatter-specific sub-channel selection procedure, a reader device may have a greater likelihood of successful decoding. In accordance with such a greater likelihood of successful decoding, source devices and reader devices may achieve higher reliability for backscattered communications, which may increase system performance (such as increase data rates, user experience, and system capacity). Further, as a result of such higher reliability and greater system performance, the described techniques may facilitate greater adoption of passive wireless devices, which may increase data rates and system capacity across various networks. For example, systems involving reliable passive wireless devices may provide relatively higher data rates, greater capacity, or otherwise perform enhanced operations as compared to systems without reliable passive wireless devices.

FIG. 1 shows an example wireless communications system 100 that supports interference reduction techniques between passive wireless devices. The wireless communications system 100 may include one or more network entities 105, one or more UEs 115, and a core network 130. In some implementations, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some implementations, network entities 105 and UEs 115 may wirelessly communicate via one or more communication links 125 (such as a radio frequency (RF) access link). For example, a network entity 105 may support a coverage area 110 (such as a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (such as any network entity described herein), a UE 115 (such as any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some implementations, network entities 105 may communicate with the core network 130, or with one another, or both. For example, network entities 105 may communicate with the core network 130 via one or more backhaul communication links 120 (such as in accordance with an S1, N2, N3, or other interface protocol). In some implementations, network entities 105 may communicate with one another via a backhaul communication link 120 (such as in accordance with an X2, Xn, or other interface protocol) either directly (such as directly between network entities 105) or indirectly (such as via a core network 130). In some implementations, network entities 105 may communicate with one another via a midhaul communication link 162 (such as in accordance with a midhaul interface protocol) or a fronthaul communication link 168 (such as in accordance with a fronthaul interface protocol), or any combination thereof. The backhaul communication links 120, midhaul communication links 162, or fronthaul communication links 168 may be or include one or more wired links (such as an electrical link, an optical fiber link), one or more wireless links (such as a radio link, a wireless optical link), among other examples or various combinations thereof. A UE 115 may communicate with the core network 130 via a communication link 155.

One or more of the network entities 105 described herein may include or may be referred to as a base station (BS) 140 (such as a base transceiver station, a radio BS, an NR BS, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some implementations, a network entity 105 (such as a BS 140) may be implemented in an aggregated (such as monolithic, standalone) BS architecture, which may be configured to utilize a protocol stack that is physically or logically integrated within a single network entity 105 (such as a single RAN node, such as a BS 140).

In some implementations, a network entity 105 may be implemented in a disaggregated architecture (such as a disaggregated BS architecture, a disaggregated RAN architecture), which may be configured to utilize a protocol stack that is physically or logically distributed among two or more network entities 105, such as an integrated access backhaul (IAB) network, an open RAN (O-RAN) (such as a network configuration sponsored by the O-RAN Alliance), or a virtualized RAN (vRAN) (such as a cloud RAN (C-RAN)). For example, a network entity 105 may include one or more of a central unit (CU) 160, a distributed unit (DU) 165, a radio unit (RU) 170, a RAN Intelligent Controller (RIC) 175 (such as a Near-Real Time RIC (Near-RT RIC), a Non-Real Time RIC (Non-RT RIC)), a Service Management and Orchestration (SMO) 180 system, or any combination thereof. An RU 170 also may be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (such as separate physical locations). In some implementations, one or more network entities 105 of a disaggregated RAN architecture may be implemented as virtual units (such as a virtual CU (VCU), a virtual DU (VDU), a virtual RU (VRU)).

The split of functionality between a CU 160, a DU 165, and an RU 170 is flexible and may support different functionalities depending on which functions (such as network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some implementations, the CU 160 may host upper protocol layer (such as layer 3 (L3), layer 2 (L2)) functionality and signaling (such as Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (such as physical (PHY) layer) or L2 (such as radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (such as via one or more RUs 170). In some implementations, a functional split between a CU 160 and a DU 165, or between a DU 165 and an RU 170 may be within a protocol layer (such as some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (such as F1, F1-c, F1-u), and a DU 165 may be connected to one or more RUs 170 via a fronthaul communication link 168 (such as open fronthaul (FH) interface). In some implementations, a midhaul communication link 162 or a fronthaul communication link 168 may be implemented in accordance with an interface (such as a channel) between layers of a protocol stack supported by respective network entities 105 that are in communication via such communication links.

In wireless communications systems (such as wireless communications system 100), infrastructure and spectral resources for radio access may support wireless backhaul link capabilities to supplement wired backhaul connections, providing an IAB network architecture (such as to a core network 130). In some implementations, in an IAB network, one or more network entities 105 (such as IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (such as a donor BS 140). The one or more donor network entities 105 (such as IAB donors) may be in communication with one or more additional network entities 105 (such as IAB nodes 104) via supported access and backhaul links (such as backhaul communication links 120). IAB nodes 104 may include an IAB mobile termination (IAB-MT) controlled (such as scheduled) by DUs 165 of a coupled IAB donor. An IAB-MT may include an independent set of antennas for relay of communications with UEs 115, or may share the same antennas (such as of an RU 170) of an IAB node 104 used for access via the DU 165 of the IAB node 104 (such as referred to as virtual IAB-MT (vIAB-MT)). In some implementations, the IAB nodes 104 may include DUs 165 that support communication links with additional entities (such as IAB nodes 104, UEs 115) within the relay chain or configuration of the access network (such as downstream). In such implementations, one or more components of the disaggregated RAN architecture (such as one or more IAB nodes 104 or components of IAB nodes 104) may be configured to operate according to the techniques described herein.

In the implementation of the techniques described herein applied in the context of a disaggregated RAN architecture, one or more components of the disaggregated RAN architecture may be configured to support interference reduction techniques between passive wireless devices as described herein. For example, some operations described as being performed by a UE 115 or a network entity 105 (such as a BS 140) may additionally, or alternatively, be performed by one or more components of the disaggregated RAN architecture (such as IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay BSs, among other examples, as shown in FIG. 1.

The UEs 115 and the network entities 105 may wirelessly communicate with one another via one or more communication links 125 (such as an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (such as a bandwidth part (BWP)) that is operated according to one or more physical layer channels for a given radio access technology (such as LTE, LTE-A, LTE-A Pro, NR). Each physical layer channel may carry acquisition signaling (such as synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (such as entity, sub-entity) of a network entity 105. For example, the terms "transmitting," "receiving," or "communicating," when referring to a network entity 105, may refer to any portion of a network entity 105 (such as a BS 140, a CU 160, a DU 165, a RU 170) of a RAN communicating with another device (such as directly or via one or more other network entities 105).

Signal waveforms transmitted via a carrier may be made up of multiple subcarriers (such as using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (such as a duration of one modulation symbol) and one subcarrier, for which the symbol period and subcarrier spacing may be inversely related. The quantity of bits carried by each resource element may depend on the modulation scheme (such as the order of the modulation scheme, the coding rate of the modulation scheme, or both), such that a relatively higher quantity of resource elements (such as in a transmission duration) and a relatively higher order of a modulation scheme may correspond to a relatively higher rate of communication. A wireless communications resource may refer to a combination of an RF spectrum resource, a time resource, and a spatial resource (such as a spatial layer, a beam), and the use of multiple spatial resources may increase the data rate or data integrity for communications with a UE 115.

The time intervals for the network entities 105 or the UEs 115 may be expressed in multiples of a basic time unit which may, in some implementations, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (such as 10 milliseconds (ms)). Each radio frame may be identified by a system frame number (SFN) (such as ranging from 0 to 1023).

Each frame may include multiple consecutively numbered subframes or slots, and each subframe or slot may have the same duration. In some implementations, a frame may be divided (such as in the time domain) into subframes, and each subframe may be further divided into a quantity of slots. Alternatively, each frame may include a variable quantity of slots, and the quantity of slots may depend on subcarrier spacing. Each slot may include a quantity of symbol periods (such as depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (such as $N_f$) sampling periods. The duration of a symbol period may depend on the subcarrier spacing or frequency band of operation.

A subframe, a slot, a mini-slot, or a symbol may be the smallest scheduling unit (such as in the time domain) of the wireless communications system 100 and may be referred to as a transmission time interval (TTI). In some implementations, the TTI duration (such as a quantity of symbol periods in a TTI) may be variable. Additionally, or alternatively, the smallest scheduling unit of the wireless communications system 100 may be dynamically selected (such as in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (such as a control resource set (CORESET)) for a physical control channel may be defined by a set of symbol periods and may extend across the system bandwidth or a subset of the system bandwidth of the carrier. One or more control regions (such as CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (such as control channel elements (CCEs)) associated with encoded information for a control information format having a given payload size. Search space sets may include common search space sets configured for sending control information to multiple UEs 115 and UE-specific search space sets for sending control information to a specific UE 115.

In some implementations, a network entity 105 (such as a BS 140, an RU 170) may be movable and therefore provide communication coverage for a moving coverage area 110. In some implementations, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (such as via Machine-to-Machine (M2M) communication). M2M communication or MTC may refer to data communication technologies that allow devices to communicate with one another or a network entity 105 (such as a BS 140) without human intervention. In some implementations, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (such as a mode that supports one-way communication via transmission or reception, but not transmission and reception concurrently). In some implementations, half-duplex communications may be performed at a reduced peak rate. Other power conservation techniques for the UEs 115 include entering a power saving deep sleep mode when not engaging in active communications, operating using a limited bandwidth (such as according to narrowband communications), or a combination of these techniques. For example, some UEs 115 may be configured for operation using a narrowband protocol type that is associated with a defined portion or range (such as set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some implementations, a UE 115 may be configured to support communicating directly with other UEs 115 via a device-to-device (D2D) communication link 135 (such as in accordance with a peer-to-peer (P2P), D2D, or sidelink protocol). In some implementations, one or more UEs 115 of a group that are performing D2D communications may be within the coverage area 110 of a network entity 105 (such as a BS 140, an RU 170), which may support aspects of such D2D communications being configured by (such as scheduled by) the network entity 105. In some implementations, one or more UEs 115 of such a group may be outside the coverage area 110 of a network entity 105 or may be otherwise unable to or not configured to receive transmissions from a network entity 105. In some implementations, groups of the UEs 115 communicating via D2D communications may support a one-to-many (1: M) system in which each UE 115 transmits to each of the other UEs 115 in the group. In some implementations, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (such as UEs 115). In some implementations, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some implementations, vehicles in a V2X system may communicate with roadside infrastructure, such as roadside units, or with the network via one or more network nodes (such as network entities 105, BSs 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (such as a mobility management entity (MME), an access and mobility management function (AMF)) and at least one user plane entity that routes packets or interconnects to external networks (such as a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (such as BSs 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communication using UHF waves may be associated with smaller antennas and shorter ranges (such as less than 100 kilometers) compared to communications using the smaller frequencies and longer waves of the high frequency (HF) or very high frequency (VHF) portion of the spectrum below 300 MHZ.

The wireless communications system 100 also may operate using a super high frequency (SHF) region, which may be in the range of 3 GHz to 30 GHZ, also known as the centimeter band, or using an extremely high frequency (EHF) region of the spectrum (such as from 30 GHz to 300 GHz), also known as the millimeter band. In some implementations, the wireless communications system 100 may support millimeter wave (mmW) communications between the UEs 115 and the network entities 105 (such as BSs 140, RUs 170), and EHF antennas of the respective devices may be smaller and more closely spaced than UHF antennas. In some implementations, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some implementations, operations using unlicensed bands may be based on a carrier aggregation configuration in conjunction with component carriers operating using a licensed band (such as LAA). Operations using unlicensed spectrum may include downlink transmissions, uplink transmissions, P2P transmissions, or D2D transmissions, among other examples.

A network entity 105 (such as a BS 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which also may be referred to as spatial filtering, directional transmission, or directional reception, is a signal processing technique that may be used at a transmitting device or a receiving device (such as a network entity 105, a UE 115) to shape or steer an antenna beam (such as a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

In some wireless communications systems, such as the wireless communications system 100, various devices (such as any one or more UEs 115 or any one or more network entities 105, or any combination thereof) may communicate (such as transmit or receive, or both) via one or more passive wireless devices and may support one or more configuration- or signaling-based mechanisms to avoid or mitigate interference between backscattered communications. For example, a source device and a reader device, each of which may be an example of a UE 115 or a network entity 105, may communicate via a passive wireless device in accordance with the passive wireless device reflecting communication from the source device to the reader device. Further, the passive wireless device may convey additional information (such as information in addition to the information transmitted by the source device) to the reader device in accordance with a backscattering modulation technique. As described herein, information or signaling transmitted by the source device may be referred to or understood as a first message and information or signaling conveyed by the passive wireless device may be referred to or understood as a second message.

In accordance with the example implementations described herein, a passive wireless device (such as a tag in an IoT deployment) may add or apply a communications signature to messaging that the passive wireless device backscatters from a source device to a reader device. In some implementations, the communications signature is specific to (such as unique to or dedicated for) the backscattered communications from the source device to the reader device from the passive wireless device. As such, if multiple passive wireless devices are deployed in a system, each passive wireless device may use a unique communications signature for backscattered communications from that passive wireless device. A passive wireless device may receive an indication of a communications signature to use (such as from one or both of a source device or a reader device) or may store a communications signature to use in a memory of the passive wireless device, or both, and a corresponding reader device may receive an indication of or store the same communications signature. Accordingly, a reader device may accurately extract relevant messaging in accordance with a communications signature that is specific or unique to backscattered communications from a specific passive wireless device. Additionally, or alternatively, a passive wireless device may support a frequency domain filtering to focus backscattered communications from the passive wireless device to a specific frequency range (such as a specific sub-channel), a source device and a reader device may employ a power control procedure that is specific to scenarios associated with backscattered communications, or a source device and a reader device may employ a sub-channel selection procedure that leverages a mapping relationship between occupied sub-channels and available sub-channels, or any combination thereof.

Figure 2:
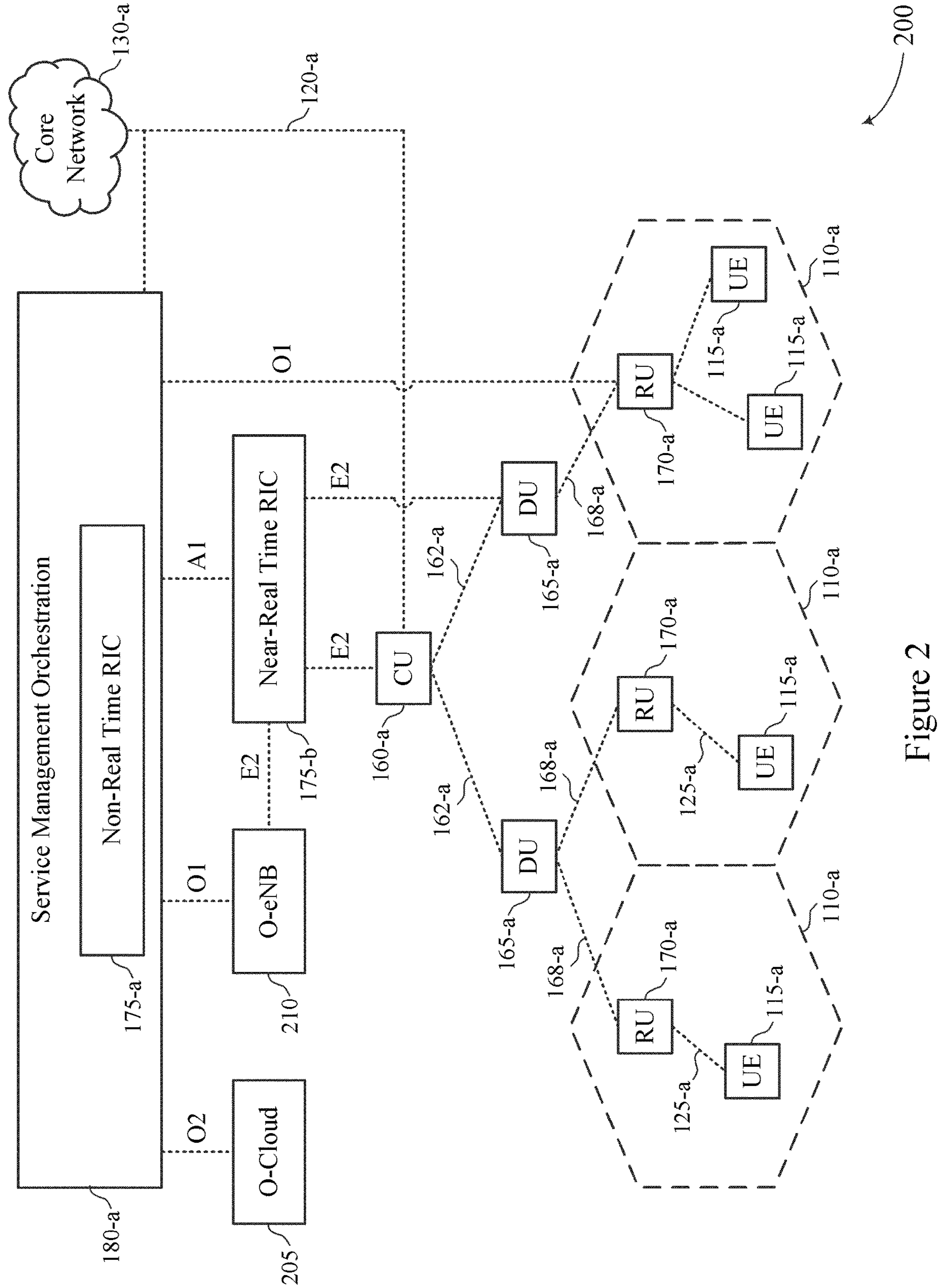
FIG. 2 shows an example network architecture that supports interference reduction techniques between passive wireless devices.

FIG. 2 shows an example network architecture 200 (such as a disaggregated base station architecture, a disaggregated RAN architecture) that supports interference reduction techniques between passive wireless devices. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (such as a Near-RT RIC 175-*b* via an E2 link, or a Non-RT RIC 175-*a* associated with an SMO 180-*a* (such as an SMO Framework), or both). A CU 160-*a* may communicate with one or more DUs 165-*a* via respective midhaul communication links 162-*a* (such as an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (such as CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (such as data, information) via a wired or wireless transmission medium. Each network entity 105, or an associated processor (such as controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (such as an RF transceiver)

configured to receive or transmit signals, or both, over a wireless transmission medium to one or more of the other network entities 105.

In some implementations, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (such as CU-UP), control plane functionality (such as CU-CP), or a combination thereof. In some implementations, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (such as base station functions, RAN functions) to control the operation of one or more RUs 170-*a*. In some implementations, a DU 165-*a* may host, at least partially, one or more of an RLC layer, a MAC layer, and one or more aspects of a PHY layer (such as a high PHY layer, such as modules for FEC encoding and decoding, scrambling, modulation and demodulation, or the like) depending, at least in part, on a functional split, such as those defined by the 3rd Generation Partnership Project (3GPP). In some implementations, a DU 165-*a* may further host one or more low PHY layers. Each layer may be implemented with an interface configured to communicate signals with other layers hosted by the DU 165-*a*, or with control functions hosted by a CU 160-*a*.

In some implementations, lower-layer functionality may be implemented by one or more RUs 170-*a*. For example, an RU 170-*a*, controlled by a DU 165-*a*, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some implementations, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (such as an O1 interface). For virtualized network entities 105, the SMO 180-*a* may be configured to interact with a cloud computing platform (such as an O-Cloud 205) to perform network entity life cycle management (such as to instantiate virtualized network entities 105) via a cloud computing platform interface (such as an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (such as via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (such as via an A1 interface) the Near-RT RIC 175-*b*. The Near-RT RIC 175-*b* may be configured to include a logical function that enables near-real-time control and optimization of RAN elements and resources via data collection and actions over an interface (such as via an E2 interface) connecting one or more CUs 160-*a*, one or more DUs 165-*a*, or both, as well as an O-eNB 210, with the Near-RT RIC 175-*b*.

In some implementations, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some implementations, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (such as reconfiguration via 01) or via generation of RAN management policies (such as A1 policies).

In some implementations, one or more devices, entities, or functionalities associated with the network architecture 200 may support one or more configuration- or signaling-based mechanisms (such as one or more physical layer, such as lower layer, procedures) to avoid or mitigate interference between backscattered communications. For example, a source device and a reader device, each of which may be an example of a UE 115 or a network entity 105, may communicate via a passive wireless device in accordance with the passive wireless device reflecting communication from the source device to the reader device. In some aspects, such a passive wireless device may be an example of a UE 115 (with reduced capability (RedCap) or non-RedCap) deploying a radio frequency identification (RFID) tag module or radio, and the UE 115 may use the RFID tag module or radio if in a power saving state (such as if a battery power of the UE 115 falls below a threshold battery power) or if performing low power communications (such as transmitting using a transmit power that is less than a threshold transmit power). In other words, a UE 115 may be an RFID device, a device that uses a low complexity receiver, or a device that is equipped with an RFID tag radio and any of such devices may be examples of a passive wireless device. The passive wireless device may convey additional information (such as information in addition to the information transmitted by the source device) to the reader device in accordance with a backscattering modulation technique.

As described herein, information or signaling transmitted by the source device may be referred to or understood as a first message and information or signaling conveyed by the passive wireless device may be referred to or understood as a second message. The first message may be associated with (such as conveyed via) a signal x(n) and the second message may be associated with (such as conveyed via) a signal s(n)x(n). In some implementations, the passive wireless device and the reader device may receive an indication of a communications signature, from a set of communications signatures, that is specific to backscattered communications from the source device to the reader device via the passive wireless device. Accordingly, the passive wireless device may transmit the second message associated with the signal s(n)x(n) in accordance with backscattering the first message associated with the signal x(n) and in accordance with the communications signature. A communications signature may refer to any unique or identifying aspect of wireless communications, such as a time domain code sequence or a power scaling factor that is specific to (such as unique to or dedicated for) backscattered communications from a passive wireless device.

Figure 3:
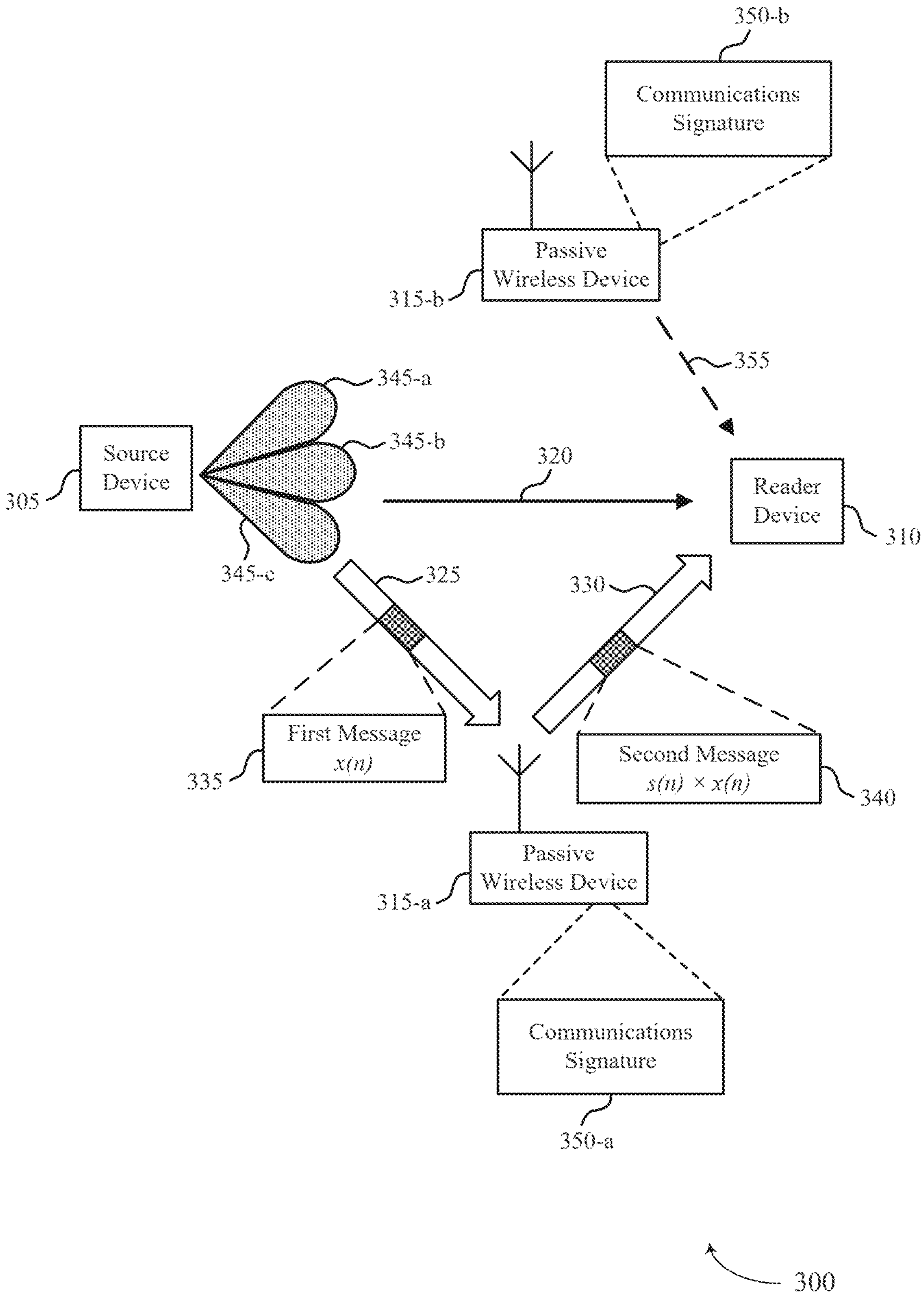
FIG. 3 shows an example signaling diagram that supports interference reduction techniques between passive wireless devices.

FIG. 3 shows an example signaling diagram 300 that supports interference reduction techniques between passive wireless devices. The signaling diagram 300 may implement or be implemented to realize aspects of the wireless communications system 100 or the network architecture 200. For example, the signaling diagram 300 illustrates communication between a source device 305 (such as a radio frequency source device), a reader device 310, and a passive wireless device 315-*a* (which may be an example of a tag, such as an IoT tag). In some implementations, the source device 305, the reader device 310, and the passive wireless device 315-*a* may employ one or more configuration- or signaling-based mechanisms according to which the devices may avoid or mitigate interference from other devices, such as interference 355 from a passive wireless device 315-*b*.

In some aspects, a passive wireless device 315 (which may generally refer to any one or more of the passive wireless device 315-*a* or the passive wireless device 315-*b*) may be an example of a passive IoT device and may employ energy harvesting and backscatter communication to communicate with one or both of a source device and a reader device. In other words, a passive wireless device 315 may be an example of a passive IoT device, which may be kinds or types of devices that rely on passive communication technology (such as backscatter communication). With such technology, manufacturers and networks may achieve low power and low cost. Further, in some commercial communication systems, UHF RFID systems may be deployed, which also may use backscatter communication. UHF RFID systems, however, may be incompatible with some cellular systems (such as NR systems). For example, RFID systems may operate using an ISM band, while NR systems may operate using a licensed band. Further, no interferences are defined or expected between those two different systems. Thus, a passive wireless device 315 may facilitate a use of passive IoT in NR, whereas a UFH RFID may be unable to facilitate such functionality.

A passive wireless device 315 may support energy harvesting enabled communication services (EHECS) in a 5G system (5GS) and, as such, may be a battery-less device or a device that otherwise has limited energy storage (such as a capacitor). A passive wireless device 315 may be a low tier device, such as a device tier similar to an RFID device, a RedCap device, or an enhanced RedCap (eRedCap) device. Alternatively, a passive wireless device 315 may not be a RedCap device and, as such, the described techniques may be applicable to non-RedCap implementations. For example, a passive wireless device 315 may be an example of a cell phone, a laptop, a smart watch, smart jewelry, a robot, a manufacturing component, a vehicle, an IoT tag, an antenna panel, a repeater, one or more patch antennas, a reflective intelligent surface (RIS), an IoT device, a narrowband (NB)-IoT device, an RFID device, a UE 115 (such as a UE 115 equipped with an RFID tag module or radio), a low complexity receiver, or an industrial IoT device (IIoT), among other examples of devices that are associated with IoT applications or capable of relaying or reflecting communication between the source device 305 and the reader device 310. In addition, or as an alternative to backscatter communication-based passive IoT where a battery-less device may collect energy from ambient radio frequency signaling and use the collected energy to redirect the signaling (such as an RFID tag), a passive wireless device 315 may use energy harvesting to power components of the passive wireless device 315 (such as an analog-to-digital converter (ADC), a mixer, or one or more oscillators). In some systems, an RFID reader may continuously transit command/write (CW) signals and may simultaneously receive signals reflected or backscattered off an RFID tag.

A passive wireless device 315 may support identification, tracking, power sourcing, access control or connectivity managing, or positioning implementations, among other examples. A passive wireless device 315, in some 5G deployment scenarios, may support or be associated with one or more constraints for data rates, power consumption, and density and may support one or more procedures or techniques associated with on-boarding (such as connection establishment), provisioning (such as connection management), and decommissioning (such as connection de-establishment) of the passive wireless device 315. Further, a passive wireless device 315 may support one or more procedures or techniques associated with identification, authentication and authorization, access control, mobility management, security, and other communication mechanisms.

In examples in which a passive wireless device 315 supports energy harvesting, the passive wireless device 315 may opportunistically harvest energy in an environment to charge a battery or otherwise obtain power to perform one or more operations (such as decoding, decryption, encryption, encoding, signal generation, or transmission). For example, a passive wireless device 315 may harvest or otherwise obtain energy from solar, heat, or ambient radio frequency radiation, or any combination thereof, and store the harvested energy in a rechargeable battery. In some aspects, a passive wireless device 315 may support energy harvesting techniques to support operation on intermittently available energy harvested from the environment as variations in amount of harvested energy can be expected. For example, a passive wireless device 315 (such as an NB-IoT device or an RFID device) may use energy harvested from solar to support one or more operations. Further, variations in amount of traffic (such as data or communication traffic) can be expected. As such, a passive wireless device 315, if operating on intermittently available energy harvested from the environment, may not (or at least may not be expected to) sustain relatively long continuous reception or transmission.

The passive wireless device 315-*a* may reflect, relay, or backscatter communication from the source device 305 to the reader device 310 and, in some aspects, may convey additional information to the reader device 310 (information in addition to that conveyed by the source device 305) via the reflected, relayed, or backscattered signal. For example, the source device 305 may transmit a signal via one or more of a communication beam 345-*a*, a communication beam 345-*b*, or a communication beam 345-*c* and the passive wireless device 315-*a* may receive a signal from the source device 305 and may modulate additional information onto the signal in accordance with an information modulation method. In some implementations, the information modulation method employed by the passive wireless device 315-*a* (a backscattering or scattering device) may be amplitude shift keying (ASK), according to which the passive wireless device 315-*a* may switch on reflection when transmitting an information bit "1" and may switch off the reflection when transmitting an information bit "0."

For example, the source device 305 may transmit a radio wave denoted as x(n) and the passive wireless device 315-*a* may convey information bits of $s(n)\in\{0,1\}$. As such, a received signal at the reader device 310 may be defined by Equation 1, shown below.

$$y(n) = (h_{D1D2}(n) + \sigma_f h_{D1T}(n) h_{TD2}(n) s(n)) x(n) + \text{noise} \quad (1)$$

As shown above in Equation 1, $h_{D102}(n)$ may denote a channel 320 between the source device 305 and the reader device 310, $\sigma_f$ may denote a reflection coefficient of the passive wireless device 315-*a*, $h_{D1T}(n)$ may denote a channel 325 between the source device 305 and the passive wireless device 315-*a*, $h_{TD2}(n)$ may denote a channel 330 between the passive wireless device 315-*a* and the reader device 310, and noise may denote any channel noise that impacts the signaling from the source device 305 to the reader device 310. Accordingly, if s(n)=0, reflection may be switched off at the passive wireless device 315-*a* and the reader device 310 may receive the direct link signal from the source device 305 (and may not receive any reflected signal from the passive wireless device 315-*a*). In such scenarios in which s(n)=0, $y(n)=h_{D1D2}(n)x(n)+\text{noise}$. Further, if s(n)=1, reflection may be switched on at the passive wireless device 315-*a* and the reader device 310 may receive a superposition of both the direct link signal and the backscatter link signal, as shown in Equation 1. To receive a transmitted information bit by the passive wireless device 315-*a*, the reader device 310 may decode x(n) using a measured, indicated, estimated, or otherwise known $h_{D1D2}(n)$ by treating or expecting the backscatter link signal as interference. The reader device 310-*a* may detect the existence of the term $\sigma_f h_{D1T}(n)h_{TD2}(n)s(n)x(n)$ by subtracting $h_{D1D2}(n)x(n)$ from y(n).

In some deployment scenarios, there may be multiple readers or multiple passive wireless devices 315 (multiple passive IoT devices or tags) within a system and several issues or challenges associated with interference from backscattered communications may arise. For example, in deployments in which there are multiple readers and a single passive wireless device 315, if the readers communicate using relatively close sub-channels, the reflected or backscattered signals from the passive wireless device 315 may overlap on some portions and interference on each reader may occur. In other words, some reflected or backscattered signaling from the passive wireless device 315 may leak into adjacent sub-channels. As such, interference may occur in a sub-channel that is between two sub-channels that are used for different command/write (CW) signals, as reflected or backscattered signaling from both different CW signals may leak into that middle sub-channel. Such interference may adversely impact a decodability of signals from the passive wireless device 315 at one or more readers in the system. As another example, in deployments in which there is a one-to-one mapping between passive wireless devices 315 and readers (such that each reader device 310 corresponds to or is associated with a specific passive wireless device 315 where each reader reads from a (different) passive wireless device 315), if two passive wireless devices 315 are communicated by (such as reflect or backscatter communication for) two readers, the reflected or backscattered signals from the passive wireless devices 315 may cause interference with each other. For example, and as illustrated by the signaling diagram 300, the reader device 310 may experience (such as receive or measure) interference 355 (such as from reflected or backscattered signaling from the passive wireless device 315-*b*).

Accordingly, in some implementations, the source device 305, the reader device 310, and the passive wireless device 315-*a* may support one or more configuration- or signaling-based interference avoidance mechanisms to avoid, reduce, or mitigate an impact of the interference 355. The one or more configuration- or signaling-based interference avoidance mechanisms may include source- or reader-side operations and implementations or may include passive wireless device-side (such as tag-side) operations and implementations, or any combination thereof. In some implementations, each passive wireless device 315 (such as each of the passive wireless device 315-*a* and the passive wireless device 315-*b*) may add or apply a communications signature 350 to reflected signals from that passive wireless device. For example, a communications signature 350 may generally refer to any one or more of a communications signature 350-*a* associated with (such as specific or unique to) the passive wireless device 315-*a* or a communications signature 350-*b* associated with (such as specific or unique to) the passive wireless device 315-*b*. Accordingly, the passive wireless device 315-*a* may receive the first message 335 from the source device 305 and may transmit (via a backscattering of the first message 335) a second message 340 to the reader device 310 in accordance with the communications signature 350-*a* (such as in accordance with an application of the communications signature 350-*a* to the reflected or backscattered signaling).

As such, each passive wireless device 315 in a system may add or apply a different communications signature 350 to reflected signaling, which may enable readers to accurately extract and decode relevant messaging as each reader may be configured with, or receive an indication of, the communications signature 350 used by an associated passive wireless device 315. For example, the passive wireless device 315-*a* and the reader device 310 may receive an indication of the communications signature 350-*a* to be used by the passive wireless device 315-*a* or may be configured with (and store in memory) the communications signature 350-*a* to be used by the passive wireless device 315-*a*, or any combination thereof. For example, a controller (such as a network entity 105, a UE 115, the reader device 310, or the source device 305) may configure or indicate the communications signature 350-*a* to one or both of the passive wireless device 315-*a*, the source device 305, or the reader device 310. An indication of a communications signature 350 may be via L1, L2, or L3 signaling. For example, the passive wireless device 315-*a*, the source device 305, or the reader device 310 may receive an indication of the communications signature 350-*a* via downlink control information (DCI), sidelink control information (SCI), a MAC control element (MAC-CE), RRC signaling, or any combination thereof. Additionally, or alternatively, passive wireless device 315 may self-select (such as autonomously select) a communications signature 350.

In some implementations, a specific communications signature 350, or a specific type of communications signature 350, may be indicated to a passive wireless device 315 in accordance with a capability of the passive wireless device

315. For example, a passive wireless device 315 may be associated with a capability or a class type (such as a tag class type) that is, in turn, associated with a capability and the passive wireless device 315 may report (such as transmit) a capability information message to a controller to indicate the capability or class type of the passive wireless device 315. In scenarios in which a passive wireless device 315 reports a class type that is associated with an underlying capability, the underlying capability may be derived, identified, determined, or selected by the controller in accordance with a configuration at the controller. A passive wireless device 315 may transmit a capability information message to the controller via L1, L2, or L3 signaling device 310. An indication of a communications signature 350 may be via L1, L2, or L3 signaling. For example, a passive wireless device 315-*a* may transmit a capability information message via DCI, SCI, a MAC-CE, RRC signaling, or any combination thereof.

In some aspects, the communications signatures 350 used by the passive wireless devices 315 may be time domain code sequences, such as orthogonal cover code (OCC) sequences, non-OCC sequences, asynchronous sequences, or any combination thereof. In such aspects, the communications signature 350-*a* associated with the passive wireless device 315-*a* may be an example of a first time domain code sequence and the communications signature 350-*b* associated with the passive wireless device 315-*b* may be an example of a second time domain code sequence different from the first time domain code sequence. In some implementations, the passive wireless device 315-*a* may apply a time domain code sequence to multiple repetitions of a first message 335 from the source device 305. For example, the passive wireless device 315-*a* may apply a respective element of the time domain code sequence to each successive repetition of the first message 335. The repetition of the first message 335 may be on a per bit level, a per group of bits level, or a per full message or tag response level. Additional details relating to such an application of a time domain code sequence as a communications signature 350 are illustrated by and described with reference to FIG. 4.

Additionally, or alternatively, the communications signatures 350 used by the passive wireless devices 315 may be power scaling factors, such as transmit power scaling factors. In such aspects, the communications signature 350-*a* associated with the passive wireless device 315-*a* may be an example of a first power scaling factor and the communications signature 350-*b* associated with the passive wireless device 315-*b* may be an example of a second power scaling factor different from the first power scaling factor. In some implementations, the specific power scaling factor configured at a passive wireless device 315 may be configured from multiple available or possible power scaling factors. In implementations in which the passive wireless device 315-*a* and the passive wireless device 315-*b* use different power scaling factors, the source device 305 may transmit a CW signal to both the passive wireless device 315-*a* and the passive wireless device 315-*b*, each of the passive wireless device 315-*a* and the passive wireless device 315-*b* may multiply the CW signal with respective power scaling factors, and the reader device 310 may perform successive cancellation to differentiate between and extract the two backscattered signals from the passive wireless device 315-*a* and the passive wireless device 315-*b*.

In such implementations, the reader device 310 may function as a non-orthogonal multiple access (NOMA) receiver. In some aspects, the power scaling factors assigned to each of the passive wireless device 315-*a* and the passive wireless device 315-*b* and the successive cancellation performed by the reader device 310 may be in accordance with an importance or priority of data of each of the passive wireless device 315-*a* and the passive wireless device 315-*b*. For example, a configured, assigned, selected, or indicated power scaling factor may be a function of an importance, priority, or quality of service (QOS) of a reflected or backscattered signal or an importance, priority, or QoS of a passive wireless device 315 itself, or any combination thereof.

Additionally, or alternatively, the source device 305 and the reader device 310 may support a power control configuration or procedure according to which each source device 305 and reader device 310 use a specific power control configuration on a specific sub-channel (such as if another reader device is sending on the same sub-channel). In such implementations in which the source device 305 and the reader device 310 employ such a power control configuration, the source device 305 and the reader device 310 may effectively support NOMA-like transmissions. Further, the power control configuration supported by the source device 305 and the reader device 310 may be separate from other power control operations that are also supported at the devices. For example, the power control configuration may be different from an uplink control procedure used by a UE 115 (such as an uplink power control associated with $p_0$+10 log 10(#RBs)+alpha+PL). For instance, the power control configuration that the source device 305 and the reader device 310 employ for interference avoidance may be specifically associated with (such as dedicated for) scenarios in which the source device 305 and the reader device 310 are attempting to mitigate interference associated with backscattered communications via the passive wireless device 315-*a*.

The power control configuration that the source device 305 and the reader device 310 use for interference avoidance associated with backscattered communications via the passive wireless device 315-*a* may be a function of which (or a quantity of) sub-channel(s) the source device 305 and the reader device 310 use, proximity to other devices in the system, by a used power of other devices in the system, or any combination thereof. In some aspects, a proximity to other devices in the system may include information associated with a positioning or distance of active devices (such as active reader UEs 115, such as reader UEs 115 that are actively transmitting) relative to the source device 305, the reader device 310, or the passive wireless device 315-*a*. In some aspects, a used power by other devices in the system may include information associated with the used power by other reader UEs 115 in the system and such information may be obtained via an indication (such as from a controller) or by computing or calculating one or more reference signal receive power (RSRP) measurements between UEs 115, which may be in part associated with a class type (such as a tag class) of the passive wireless device 315-*a*).

Further, although described herein and illustrated separately as a source device 305 and a reader device 310, the source device 305 and the reader device 310 may be part of a same device or collocated. In scenarios in which the source device 305 and the reader device 310 are part of a same device, such a same device may be referred to herein generally as a reader, such as a reader that operates, includes, or is associated with a radio frequency source (such as a radio frequency source UE). Accordingly, the example implementations described herein may be applicable to mono-static deployments or bistatic deployments, or any combination of mono-static deployments and bistatic deployments. Likewise, the example implementations may be applicable to reader-side operation, radio frequency source-side operation, tag-side operation, or any combination thereof.

Figure 4:
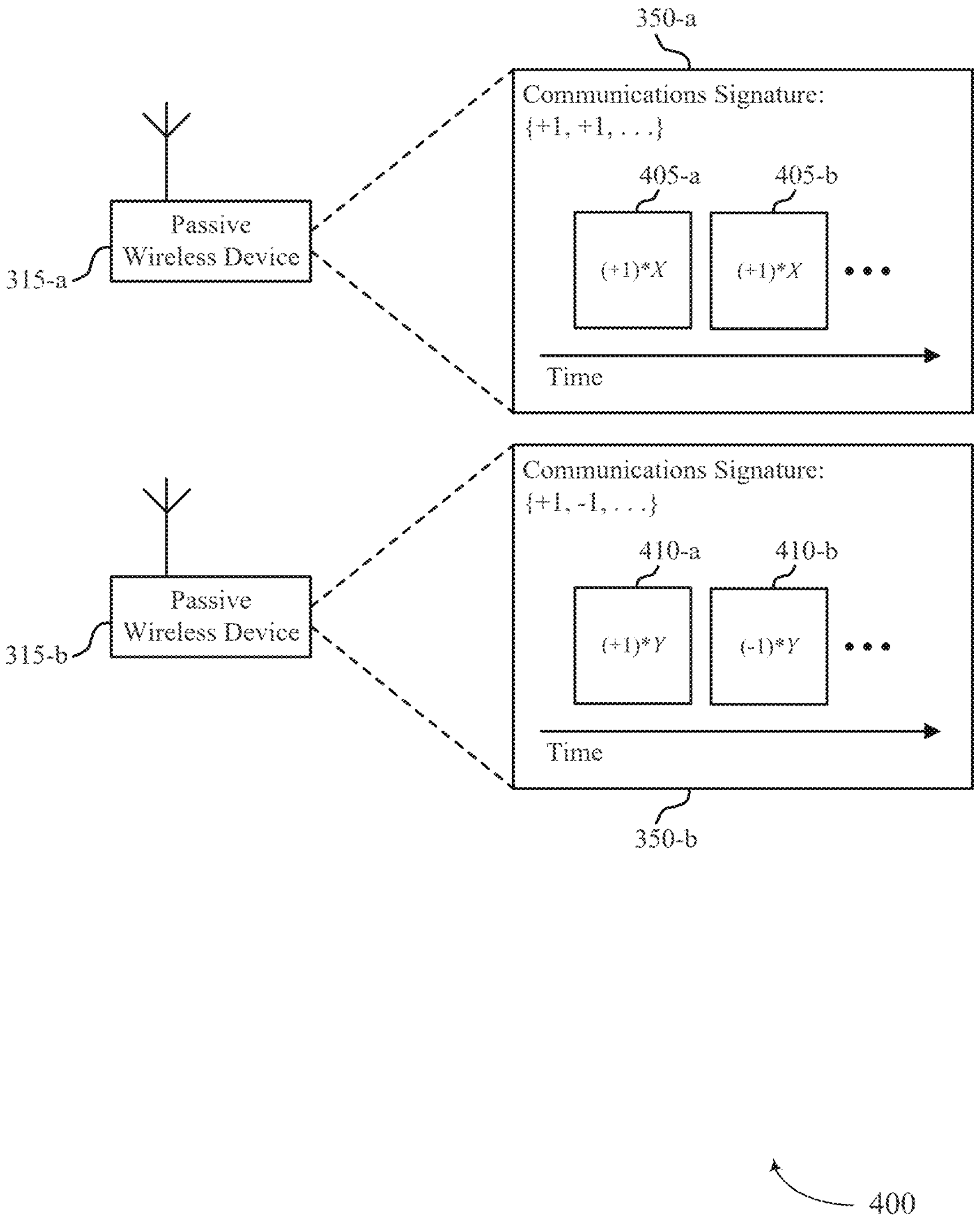
FIG. 4 shows example code-based communications signatures that support interference reduction techniques between passive wireless devices.

FIG. 4 shows example code-based communications signatures 400 that support interference reduction techniques between passive wireless devices. The code-based communications signatures 400 may implement or be implemented to realize aspects of the wireless communications system 100, the network architecture 200, or the signaling diagram 300. For example, the passive wireless device 315-*a* and the passive wireless device 315-*b*, which may be examples of the passive wireless device 315-*a* and the passive wireless device 315-*b* as illustrated by and described with reference to FIG. 3, may apply code-based communications signatures 400. In other words, for example, the communications signature 350-*a* associated with the passive wireless device 315-*a* and the communications signature 350-*b* associated with the passive wireless device 315-*b* may each be examples of code-based communications signatures 400 (such as time domain code sequences).

In implementations in which the passive wireless device 315-*a* and the passive wireless device 315-*b* use time domain code sequences, one or more readers (such as a source device 305) may send repeated bits, groups of bits, or blocks (such as entire or complete messages) and the passive wireless device 315-*a* and the passive wireless device 315-*b* may modulate each repetition with an element of a time domain code sequence (such as an OCC sequence, a non-OCC sequence, or an asynchronous code sequence, such as an asynchronous CDMA-like code sequence). For example, and as illustrated in FIG. 4, the communications signature 350-*a* associated with the passive wireless device 315-*a* may be a time domain code sequence of {+1, +1, . . . } and the communications signature 350-*b* associated with the passive wireless device 315-*b* may be a time domain code sequence of {+1, −1, . . . }. As such, the passive wireless device 315-*a* may apply a first element "+1" from the communications signature 350-*a* to a first repetition 405-*a* of a repeated message X received from a source device 305, a second element "+1" from the communications signature 350-*a* to a second repetition 405-*b* of the repeated message X received from the source device 305, and so on. Similarly, the passive wireless device 315-*b* may apply a first element "+1" from the communications signature 350-*b* to a first repetition 410-*a* of a repeated message Y received from a source device 305, a second element "−1" from the communications signature 350-*b* to a second repetition 410-*b* of the repeated message Y received from the source device 305, and so on.

In such examples, a reader device 310 may receive a first signal $Z_1$=X+Y+$noise_1$ at a first time occasion and may receive a second signal $Z_2$=X−Y+$noise_2$ at a second time occasion. As such, to obtain the signal X in this example, the reader device 310 may add $Z_1+Z_2$ to calculate 2X+$noise_1$+$noise_2$. The reader device 310 may divide by 2 to obtain X+($noise_1$+$noise_2$)/2. Generally, the reader device 310 may receive repetitions of a set of messages (such as X and Y) and may extract a message X in accordance with multiplying each of the repetitions of the set of messages by a conjugate of the time domain code sequence imparted on the repetitions associated with the message X (such as a conjugate of the communications signature 350-*a*) to obtain a set of products and summing or adding the set of products to isolate (such as identify or obtain) the message X.

In some aspects, X may refer to an entirety of the message X and, as such, the described application of elements of a time domain code sequence to repetitions of the message X may refer to repetition per block of reading/writing such that a passive wireless device 315 repeats the "response." In other words, for a time domain code sequence of [1 −1], a reader may process two repetitions of a full message "A B C D E F" as "A B C D E F A B C D E F" and, for a per response application of the time domain code sequence, an output may be "A B C D E F −A −B −C −D −E −F" (such that the first repetition of the full message is multiplied by +1 and the second repetition of the full message is multiplied by −1). In such per response scenarios, a reader may process across 2 response blocks across the 2 responses from the passive wireless device 315.

Additionally, or alternatively, a passive wireless device 315 may apply a time domain code sequence per bit or per group of bits (such that a reader may repeat at a per bit level and the passive wireless device 315 may apply the time domain code sequence at a per bit level, which may be in line with an asynchronous CDMA design). In other words, a passive wireless device 315 may apply an OCC sequence or a non-OCC sequence per bit or per group of bits. In implementations in which a passive wireless device 315 applies a time domain code sequence per bit, an output may be "A −A B −B C −C D −D E −E F −F." In such implementations, each repetition of the message may correspond to a bit of the message and a passive wireless device 315 may apply a respective element of a time domain code sequence to each successive bit-level repetition of the message. In such per bit scenarios, processing across a passive wireless device 315 may be per bit such that a reader selects every 2 bits and processes the selected 2 bits.

A time domain code sequence may include various types of sequences, and which sequences are available for use may depend on whether repetition is done at a per bit level, a per group or block of bits level, or a per response level. For example, a time domain code sequence may be a cover code based on at least one of a Gold code or sequence, m-sequence or code, a Walsh or Hadamard code or sequence, a DFT code or sequence, a Zadoff-Chu sequence, or a Reed-Solomon code or sequence. Additionally, or alternatively, one or more of a source device 305, a reader device 310, or a passive wireless device 315 may support a modulation or encoding of a bit into a sequence of an orthogonal sequence such that two passive wireless devices 315 may use two orthogonal sequences to deliver their respective "0" and "1" bits. Thus, a time domain code sequence may include a modulating or encoding of one or more bits (or an entire response) into a Gold code or sequence, m-sequence or code, a Walsh or Hadamard code or sequence, a DFT code or sequence, a Zadoff-Chu sequence, or a Reed-Solomon code or sequence using pulse amplitude modulation (PAM), pulse width modulation (PWM), pulse position modulation (PPM), or pulse code modulation (PCM) to achieve such orthogonality.

In some implementations, to separate or differentiate between passive wireless devices 315 (such as RFID tags), each passive wireless device 315 may be assigned a different set of sequences from a sequence pool to reduce or mitigate interference among the passive wireless devices 315, which may enable a reader to identify, select, or determine a source of passive wireless device 315 (such as RFID tag) transmissions or backscattered signals. To generate orthogonal sequences reflected by M passive wireless devices 315, the passive wireless devices 315 may use 2M different pulse positions or 2M amplitudes. In implementations in which 2M different pulse positions are used (which may be in implementations in which PPM is used), a passive wireless device 315 may split time into 2M positions, where one position among the 2M positions may have a non-zero signal and a remainder of the positions may be zero signals. In implementations in which 2M amplitudes are used (which may be in implementations in which PAM is used), each passive wireless device 315 may encode data in a bit-by-bit manner (such as encode a bit into a sequence of M transmissions with a single position with non-zero value) and a passive wireless device 315 may be assigned 2 possibilities of the 2M possibilities to encode the two bits. The other passive wireless devices 315 may be assigned 2 of the remaining 2M−2 sequences.

For example, assuming 2 passive wireless devices 315 (such as 2 tags), one bit may be transmitted using a sequence of {OFF, OFF, OFF, ON}; {OFF, OFF, ON, OFF}, {OFF, ON, OFF, OFF}, or {ON, OFF, OFF, OFF}. Two sequences may be given to (such as configured at or signaled to) a first passive wireless device 315 (such as an RFID tag 1) to send its bit "0" or "1". For example, a "0" for the first passive wireless device 315 may be associated with a sequence {OFF, OFF, OFF, ON} and a "1" may be associated with a sequence {OFF, OFF, ON, OFF}. For a second passive wireless device 315 (such as an RFID tag 2), a "0" may be associated with a sequence {OFF, ON, OFF, OFF} and "1" may be associated with a sequence {ON, OFF, OFF, OFF}. As such, a reader may separate, identify, or otherwise determine if a transmission is from the first passive wireless device 315 (such as the RFID tag 1) or the second passive wireless device 315 (such as the RFID tag 2), or both at a same time, and can decode one or both of them accordingly.

Figure 5:
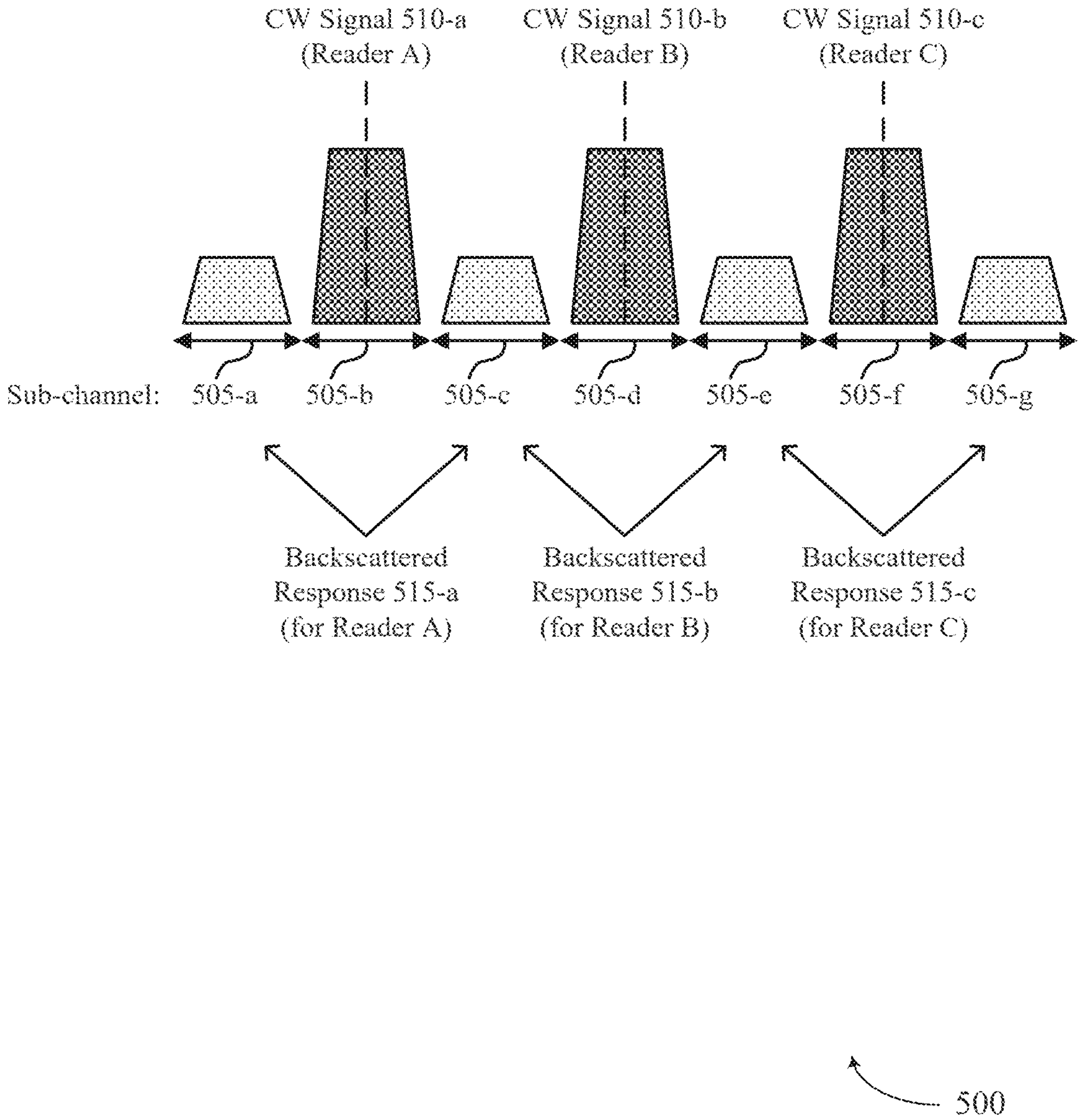
FIG. 5 shows example frequency domain responses of backscattered communications that support interference reduction techniques between passive wireless devices.

FIG. 5 shows example frequency domain responses 500 of backscattered communications that support interference reduction techniques between passive wireless devices. may implement or be implemented to realize aspects of the wireless communications system 100, the network architecture 200, the signaling diagram 300, or the code-based communications signatures 400. For example, a system of readers and passive wireless devices 315 may use a set of sub-channels 505 (which may generally refer to any one or more of a sub-channel 505-*a*, a sub-channel 505-*b*, a sub-channel 505-*c*, a sub-channel 505-*d*, a sub-channel 505-*f*, or a sub-channel 505-*g*) that are in close proximity and may support one or more configuration- or signaling-based mechanisms according to which the readers and passive wireless devices 315 may avoid or mitigate interference between backscattered communications.

For example, a reader A may transmit a CW signal 510-*a* using a sub-channel 505-*b*, a reader B may transmit a CW signal 510-*b* using a sub-channel 505-*d*, and a reader C may transmit a CW signal 510-*c* using a sub-channel 505-*f*. In some scenarios, a backscattered response 515-*a* for reader A may leak into a sub-channel 505-*a* and a sub-channel 505-*c*, a backscattered response 515-*b* for reader B may leak into the sub-channel 505-*c* and a sub-channel 505-*e*, and a backscattered response 515-*c* for reader C may leak into the sub-channel 505-*e* and a sub-channel 505-*g*. In such scenarios, interference between backscattered communications may arise at the sub-channel 505-*c* and the sub-channel 505-*e*.

To avoid or mitigate such interference being received or experienced at the readers, one or more passive wireless devices 315 may support and implement reception filtering or transmission filtering, or both. In other words, the passive wireless devices 315 may support a reception filtering (such as receive-side filtering) capability or a transmission filtering (such as transmit-side filtering) capability, or both. As such, in accordance with each tag capability or tag class (where a class may be associated with a capability of filtering and possibly configurable reception or transmission filtering), a reader, network entity 105, UE 115, or other controller may transmit an indication of configurable bandwidth information to a passive wireless device 315 and the passive wireless device 315 may use the indication of the configurable bandwidth information to reduce interference to other readers in the system.

For example, a passive wireless device 315 may receive an indication of a bandwidth (such as a specific sub-channel 505) over which a source device 305 is to transmit a message to the passive wireless device 315 for backscattering and the passive wireless device 315 may, in accordance with a capability or configuration, filter out radio frequency energy received outside of the indicated bandwidth either at a receive-side (such as at a front end of the passive wireless device 315) or at a transmit-side. In some implementations, such as implementations in which a passive wireless device 315 supports energy harvesting, receive-side filtering may occur prior to energy harvesting at the passive wireless device 315. In such implementations, the passive wireless device 315 may be unable to use the filtered out radio frequency energy for energy harvesting. Accordingly, in some other implementations, the passive wireless device 315 may perform transmit-side filtering to enable the passive wireless device 315 to harvest energy from interfering signals (such as from radio frequency energy from signals from other devices and readers received outside of the indicated bandwidth) and to subsequently backscatter a signal received (exclusively) within the indicated bandwidth. As such, the passive wireless device 315 may avoid contributing energy to sub-channels 505 outside of a specific sub-channel 505 over which a corresponding reader transmits a CW signal. In an example, in accordance with such a transmit-side filtering, the backscattered response 515-*a* may stay consolidated within the sub-channel 505-*b*, but the corresponding passive wireless device 315 may use radio frequency energy received via the sub-channel 505-*a*, the sub-channel 505-*b*, and the sub-channel 505-*c* (among potentially other sub-channels 505).

Additionally, or alternatively, readers may perform a listen-before-talk (LBT) procedure to select which one or more sub-channels 505 to use. For example, the reader A may start the process by selecting a sub-channel 505 (such as the sub-channel 505-*b*). The reader B may perform an LBT procedure (such as listen or overhear) and perform detection over a set of configured, identified, selected, measured, or otherwise determined sub-channels 505 and, if the set of sub-channels 505 are not occupied or utilized (or include at least some available sub-channels 505), the reader B may make a list of available sub-channels 505 and select a sub-channel from the list to read using. In some implementations, the selected sub-channel 505 (such as the sub-channel 505-*d*) may be a function of the used or occupied sub-channels 505. In an example, the reader B may select the sub-channel 505-*f* to avoid causing any interference to the reader A (without the assistance of other interference avoidance mechanisms).

Accordingly, in some implementations, a reader (such as a source device 305 and a reader device 310) may support a configuration according to which specific sets of sub-channels 505 are available given that another specific set of sub-channels 505 are occupied. In such implementations, such a configuration may be associated with a mapping relationship that indicates a correspondence between sets of occupied sub-channels 505 and sets of available sub-channels 505. In other words, the mapping relationship may indicate that if a first set of sub-channels 505 are measured or otherwise determined to be occupied, a second set of sub-channels 505 are available for use, if a third set of sub-channels 505 are measured or otherwise determined to be occupied, a fourth set of sub-channels 505 are available for use, and so on, where an input into the mapping relationship is the occupied set of sub-channels 505 and an output of the mapping relationship indicates the correspondingly available set of sub-channels 505. For example, the reader A may use a sub-channel Y if the reader B is using a sub-channel X.

Such a relation between a "used list of sub-channels" and "sub-channels that are allowed to be used given the used list of sub-channels" may be defined by a network specification and indicated via one or more tables, configured by a network entity 105 or another controlling unit that controls a set of readers (such as the reader A, the reader B, and the reader C), or negotiated and agreed to by readers via an RRC connection between the readers (such as via a sidelink or via another link, such as a link dedicated for negotiating and agreeing to such a mapping relationship, or via a link over which the readers may communicate as reader to reader). In some aspects, the mapping relationship may be associated with a delta n. For example, if the reader B is using a sub-channel X=x, the reader A may use a sub-channel Y=x+n. Further, in implementations in which the mapping relationship is indicated or otherwise conveyed via signaling, an indication of the mapping relationship may be transmitted or received via DCI, SCI, a shared data channel, a licensed data channel, a MAC-CE, RRC signaling, or any combination thereof.

Figure 6:
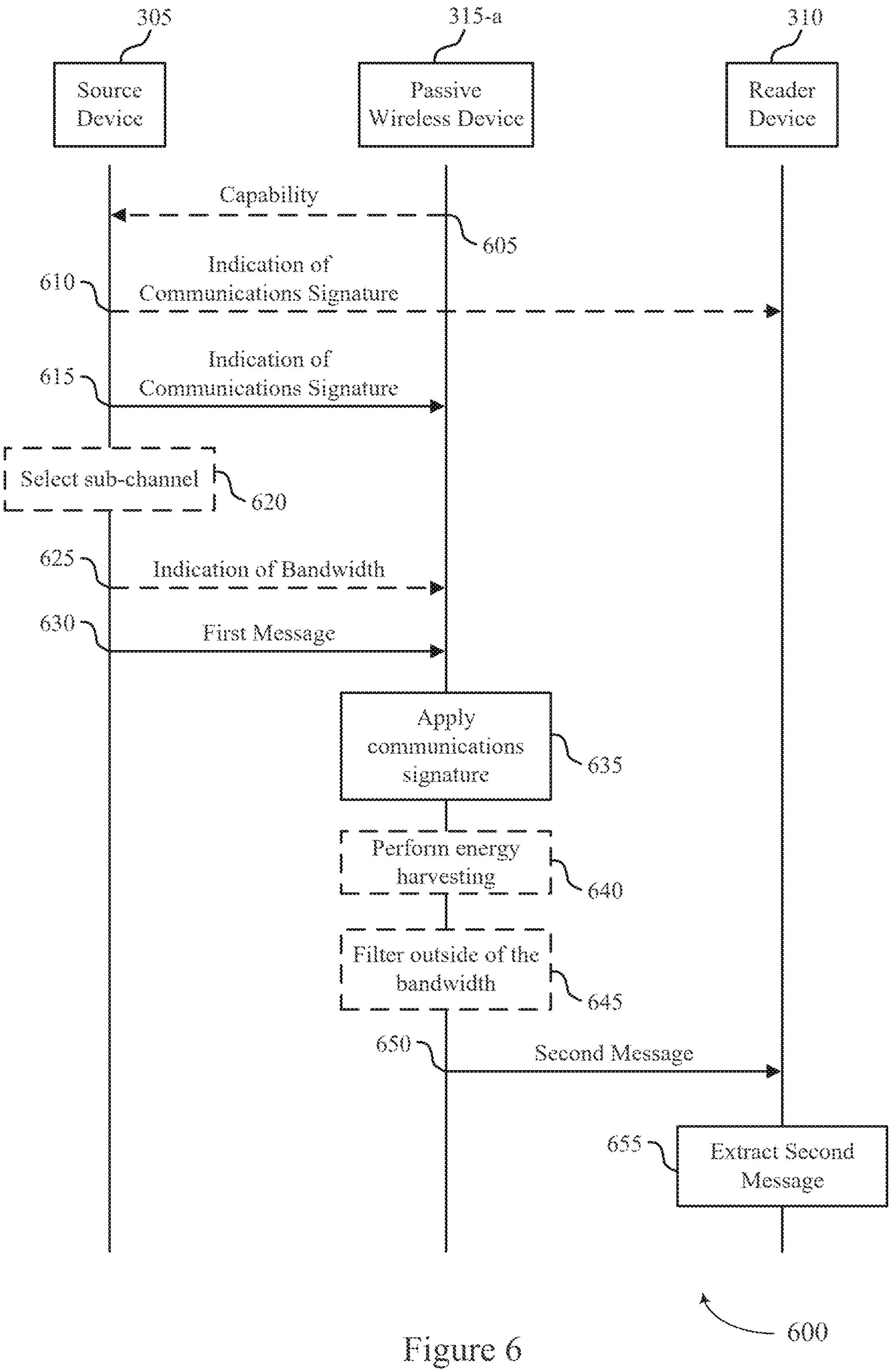
FIG. 6 shows an example process flow that supports interference reduction techniques between passive wireless devices.

FIG. 6 shows an example process flow 600 that supports interference reduction techniques between passive wireless devices. The process flow 600 may implement or be implemented to realize aspects of the wireless communications system 100, the network architecture 200, the signaling diagram 300, the code-based communications signatures 400, or the frequency domain responses 500. For example, the process flow 600 illustrates backscattered communications from a source device 305 to a reader device 310 via a passive wireless device 315-*a*, which may be examples of the source device 305, the reader device 310, and the passive wireless device 315-*a* as illustrated by or described with reference to FIGS. 1-5. In some implementations, such devices may support one or more configuration- or signaling-based interference avoidance mechanisms according to which such devices may avoid or mitigate interference associated with backscattered communications from the source device 305 to the reader device 310 via the passive wireless device 315-*a*.

In the following description of the process flow 600, the operations may be performed (such as reported or provided) in a different order than the order shown, or the operations performed by the example devices may be performed in different orders or at different times. For example, specific operations also may be left out of the process flow 600, or other operations may be added to the process flow 600. Further, although some operations or signaling may be shown to occur at different times for discussion purposes, these operations may actually occur at the same time.

At 605, the passive wireless device 315-*a* may transmit an indication of a capability of the passive wireless device 315-*a* associated with the interference avoidance for the backscattered communications. In some implementations, the passive wireless device 315-*a* may transmit the indication of the capability via a capability information message to a controller (such as the source device 305, the reader device 310, a network entity 105, a UE 115, or another controlling device to which the passive wireless device 315-*a* can establish a connection). As such, although illustrated as being sent from the passive wireless device 315-*a* to the source device 305, the passive wireless device 315-*a* may additionally, or alternatively, transmit the indication of the capability to one or more other devices.

At 610, the source device 305 may transmit, to the reader device 310, an indication of a communications signature, from a set of communications signatures, that is specific to the backscattered communications from the source device 305 to the reader device 310 via the passive wireless device 315-*a*. In some implementations, the communications signature may be associated with interference avoidance for the backscattered communications. The communications signature may be a time domain code sequence or a power scaling factor. The source device 305 may transmit the indication of the communications signature via a wired or wireless link and via any one or more of L1, L2, or L3 signaling. Additionally, or alternatively, the communications signature may be stored locally (such as in memory) at the reader device 310.

At 615, the source device 305 may transmit, to the passive wireless device 315-*a*, an indication of the communications signature, from the set of communications signatures, that is specific to the backscattered communications from the source device 305 to the reader device 310 via the passive wireless device 315-*a*. In some implementations, the communications signature may be associated with interference avoidance for the backscattered communications. The communications signature may be a time domain code sequence or a power scaling factor. The source device 305 may transmit the indication of the communications signature via a wired or wireless link and via any one or more of L1, L2, or L3 signaling. Additionally, or alternatively, the communications signature may be stored locally (such as in memory) at the passive wireless device 315-*a*.

At 620, the source device 305 may select a sub-channel for the backscattered communications. In some implementations, the source device 305 may measure that a first set of sub-channels are occupied in accordance with an energy detection or LBT procedure at the source device 305 and may select the sub-channel from a second set of sub-channels, where the second set of sub-channels is associated with the first set of sub-channels in accordance with a mapping relationship between occupied sub-channels and available sub-channels. Although shown as being performed by the source device 305, the reader device 310 (if different from the source device 305) may additionally, or alternatively, select the sub-channel for the backscattered communications.

At 625, the source device 305 may transmit, to the passive wireless device 315-*a*, an indication of a bandwidth associated with a first message to be sent via backscattering by the passive wireless device 315-*a*. In some implementations, the passive wireless device 315-*a* may use the indication of the bandwidth for frequency domain filtering of the backscattered communications.

At 630, the source device 305 may transmit, to the reader device 310 via a backscattering from the passive wireless device 315-*a*, a first message in accordance with the communications signature. For example, the source device 605 may transmit the first message to the passive wireless device 315-*a* for application of the communications signature. As such, the source device 305 may transmit the first message as a result of transmitting the indication(s) of the communications signature or otherwise in a manner that facilitates the application of the communications signature at the passive wireless device 315-*a* (such as with bit level, group of bits level, or response level repetition). Additionally, or alternatively, the source device 305 may transmit the first message in accordance with the communications signature by applying a power scaling factor associated with backscattered communications at the source device 305.

At 635, the passive wireless device 315-*a* may apply the communications signature. For example, the passive wireless device 315-*a* may apply a power scaling factor, a time domain code sequence, or a filtering technique associated with avoiding or mitigating interference associated with the backscattered communications from the passive wireless device 315-*a*.

At 640, the passive wireless device 315-*a* may perform energy harvesting using first radio frequency energy received within an indicated bandwidth associated with the first message and using second radio frequency energy received outside of the bandwidth associated with the first message. For example, if the passive wireless device 315-*a* employs a power scaling factor, a time domain code sequence, or a transmit-side filtering technique for interference avoidance, the passive wireless device 315-*a* may use radio frequency energy received at the passive wireless device 315-*a* regardless of whether the energy is received in-band or out-of-band of the first message.

At 645, the passive wireless device 315-*a* may filter the second radio frequency energy received outside of the bandwidth associated with the first message to focus the backscattering of the first message to the bandwidth associated with the first message. As such, the passive wireless device 315-*a* may avoid or mitigate how much the reflected or backscattered signal leaks into one or more neighboring sub-channels.

At 650, the passive wireless device 315-*a* may transmit, to the reader device 310, a second message via a backscattering of the first message and in accordance with the communications signature. For example, the passive wireless device 315-*a* may transmit the second message using a power scaling factor, using a time domain code sequence, or using a filtering technique that avoids or mitigates interference associated with the backscattering by the passive wireless device 315-*a* to the reader device 310.

At 655, the reader device 310 may extract (such as identify, decode, or isolate) the second message from signaling received at the reader device 310. In some implementations, the reader device 310 may extract the second message in accordance with successive cancellation associated with a power scaling factor used by the passive wireless device 315-*a*. Additionally, or alternatively, the reader device 310 may extract the second message in accordance with multiplying a set of messages by a conjugate of a time domain code sequence applied by the passive wireless device 315-*a* and adding a set of products together to obtain the second message. In such implementations in which the passive wireless device 315-*a* uses a time domain code sequence, the reader device 310 may extract the second message using the time domain code sequence of the passive wireless device 315-*a* as well as time domain code sequences of one or more other passive wireless devices 315. For example, the reader device 310 may receive an indication of or otherwise determine a respective time domain code sequence used by each of multiple passive wireless devices 315 and may use the set of time domain code sequences to extract messages backscattered from one or more of the multiple passive wireless devices 315.

Figure 7:
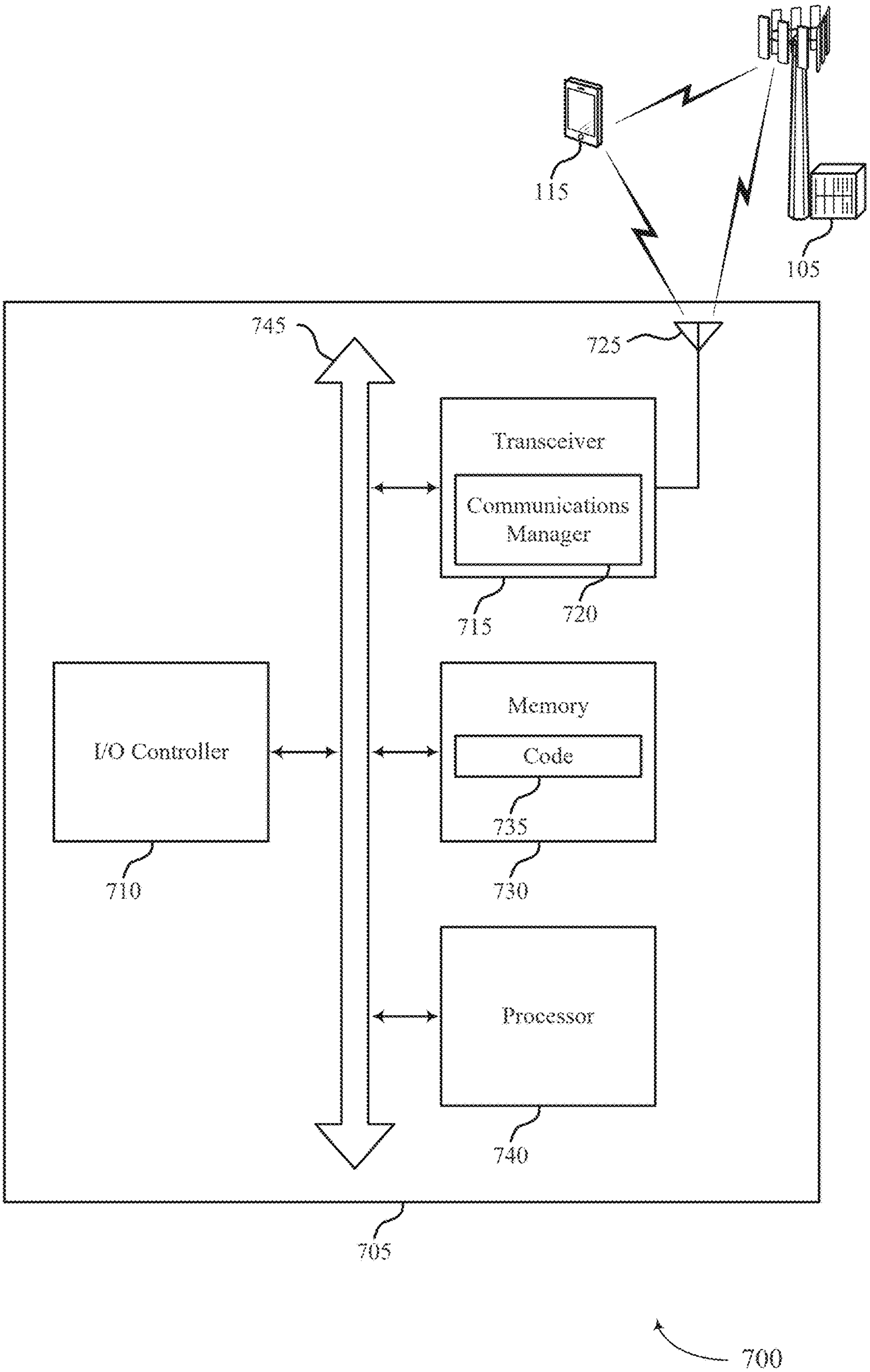
FIGS. 7 and 8 show block diagrams of example devices that support interference reduction techniques between passive wireless devices.

FIG. 7 shows a block diagram 700 of an example device 705 that supports interference reduction techniques between passive wireless devices. The device 705 may communicate (such as wirelessly) with one or more network entities (such as one or more components of one or more network entities 105), one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (such as operatively, communicatively, functionally, electronically, electrically) via one or more buses (such as a bus 745).

The I/O controller 710 may manage input and output signals for the device 705. The I/O controller 710 also may manage peripherals not integrated into the device 705. In some implementations, the I/O controller 710 may represent a physical connection or port to an external peripheral. In some implementations, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some implementations, the I/O controller 710 may be implemented as part of a processor or processing system, such as the processor 740. In some implementations, a user may interact with the device 705 via the I/O controller 710 or via hardware components controlled by the I/O controller 710.

In some implementations, the device 705 may include a single antenna 725. However, in some other implementations, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 also may include a modem to modulate the packets, to provide the modulated packets to one or more antennas 725 for transmission, and to demodulate packets received from the one or more antennas 725.

In some implementations, the transceiver 715 may include one or more interfaces, such as one or more interfaces coupled with the one or more antennas 725 that are configured to support various receiving or obtaining operations, or one or more interfaces coupled with the one or more antennas 725 that are configured to support various transmitting or outputting operations, or a combination thereof. In some implementations, the transceiver 715 may include or be configured for coupling with one or more processors or memory components that are operable to perform or support operations based on received or obtained information or signals, or to generate information or other signals for transmission or other outputting, or any combination thereof. In some implementations, the transceiver 715, or the transceiver 715 and the one or more antennas 725, or the transceiver 715 and the one or more antennas 725 and one or more processors or memory components (such as the processor 740, or the memory 730, or both), may be included in a chip or chip assembly that is installed in the device 705.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some implementations, the code 735 may not be directly executable by the processor 740 but may cause a computer (such as when compiled and executed) to perform functions described herein. In some implementations, the memory 730 may contain, among other things, a basic I/O system (BIOS) which may control basic hardware or software operation such as the interaction with peripheral components or devices.

The processor 740 may include an intelligent hardware device (such as a general-purpose processor, a digital signal processor (DSP), an application-specific integrated circuit (ASIC), a central processing unit (CPU), a field-programmable gate array (FPGA), a microcontroller, a programmable logic device, discrete gate or transistor logic, a discrete hardware component, or any combination thereof). In some implementations, the processor 740 may be configured to operate a memory array using a memory controller. In some other implementations, a memory controller may be integrated into the processor 740. The processor 740 may be configured to execute computer-readable instructions stored in a memory (such as the memory 730) to cause the device 705 to perform various functions (such as functions or tasks supporting interference reduction techniques between passive wireless devices). For example, the device 705 or a component of the device 705 may include a processor 740 and memory 730 coupled with the processor 740, the processor 740 and memory 730 configured to perform various functions described herein. The processor 740 may be an example of a cloud-computing platform (such as one or more physical nodes and supporting software such as operating systems, virtual machines, or container instances) that may host the functions (such as by executing code 735) to perform the functions of the device 705. The processor 740 may be any one or more suitable processors capable of executing scripts or instructions of one or more software programs stored in the device 705 (such as within the memory 730). In some implementations, the processor 740 may be a component of a processing system.

A processing system may generally refer to a system or series of machines or components that receives inputs and processes the inputs to produce a set of outputs (which may be passed to other systems or components of, for example, the device 705). For example, a processing system of the device 705 may refer to a system including the various other components or subcomponents of the device 705, such as the processor 740, or the transceiver 715, or the communications manager 720, or other components or combinations of components of the device 705. The processing system of the device 705 may interface with other components of the device 705, and may process information received from other components (such as inputs or signals) or output information to other components. For example, a chip or modem of the device 705 may include a processing system and one or more interfaces to output information, or to obtain information, or both.

The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 705 may transmit information output from the chip or modem. Additionally, or alternatively, in some implementations, the one or more interfaces may refer to an interface between the processing system of the chip or modem and a receiver, such that the device 705 may obtain information or signal inputs, and the information may be passed to the processing system. A person having ordinary skill in the art will readily recognize that a first interface also may obtain information or signal inputs, and a second interface also may output information or signal outputs.

The communications manager 720 may support wireless communication at a passive wireless device in accordance with examples as disclosed herein. For example, the communications manager 720 may be configured as or otherwise support a means for receiving an indication of a communications signature, from a set of communications signatures, that is specific to backscattered communications from a source device to a reader device via the passive wireless device, where the communications signature is associated with interference avoidance for the backscattered communications. The communications manager 720 may be configured as or otherwise support a means for receiving a first message from the source device. The communications manager 720 may be configured as or otherwise support a means for transmitting, to the reader device, a second message via a backscattering of the first message and in accordance with the communications signature.

In some implementations, the communications manager 720 may be configured as or otherwise support a means for transmitting an indication of a capability of the passive wireless device associated with the interference avoidance for the backscattered communications, where the communications signature is associated with the capability of the passive wireless device.

In some implementations, to support receiving the indication of the communications signature, the communications manager 720 may be configured as or otherwise support a means for receiving an indication of a time domain code sequence, where the communications signature includes the time domain code sequence.

In some implementations, to support transmitting the second message via the backscattering of the first message and in accordance with the communications signature, the communications manager 720 may be configured as or otherwise support a means for applying the time domain code sequence to a set of multiple repetitions of the first message.

In some implementations, the time domain code sequence is associated with a sequence of elements. In some implementations, a respective element of the sequence of elements is applied to each successive repetition of the set of multiple repetitions of the first message.

In some implementations, the time domain code sequence is an orthogonal cover code (OCC) sequence, a non-OCC sequence, or an asynchronous code sequence.

In some implementations, the time domain code sequence is applied per bit, per group of bits, or per response from the passive wireless device.

In some implementations, to support receiving the indication of the communications signature, the communications manager 720 may be configured as or otherwise support a means for receiving an indication of a power scaling factor, where the communications signature includes the power scaling factor.

In some implementations, to support transmitting the second message via the backscattering of the first message and in accordance with the communications signature, the communications manager 720 may be configured as or otherwise support a means for applying the power scaling factor to the second message, where the communications signature includes the power scaling factor.

In some implementations, the power scaling factor is associated with a first priority or a first quality of service (QOS) associated with the passive wireless device, or associated with a second priority or a second QoS associated with the first message.

In some implementations, the communications manager 720 may be configured as or otherwise support a means for receiving an indication of a bandwidth associated with the first message, where a frequency domain filtering of the backscattered communications from the passive wireless device is associated with the indication of the bandwidth.

In some implementations, the communications manager 720 may be configured as or otherwise support a means for performing energy harvesting using first radio frequency energy received within the bandwidth associated with the first message and using second radio frequency energy received outside of the bandwidth associated with the first message. In some implementations, the communications manager 720 may be configured as or otherwise support a means for filtering the second radio frequency energy received outside of the bandwidth associated with the first message to focus the backscattering of the first message to the bandwidth associated with the first message.

In some implementations, the first message corresponds to a first radio wave associated with a first set of bits and the second message corresponds to a second radio wave associated with a second set of bits. In some implementations, the backscattering by the passive wireless device is associated with an amplitude shift keying modulation of the first set of bits with the second set of bits via selective reflection by the passive wireless device.

Additionally, or alternatively, the communications manager 720 may support wireless communication at a reader device in accordance with examples as disclosed herein. For example, the communications manager 720 may be configured as or otherwise support a means for receiving an indication of a communications signature, from a set of communications signatures, that is specific to backscattered communications from a source device to the reader device via a passive wireless device, where the communications signature is associated with interference avoidance for the backscattered communications. The communications manager 720 may be configured as or otherwise support a means for receiving, via a backscattering from the passive wireless device, a message in accordance with the communications signature.

In some implementations, to support receiving the indication of the communications signature, the communications manager 720 may be configured as or otherwise support a means for receiving an indication of a time domain code sequence of the passive wireless device, where the communications signature includes the time domain code sequence of the passive wireless device.

In some implementations, to support receiving the message via the backscattering from the passive wireless device and in accordance with the communications signature, the communications manager 720 may be configured as or otherwise support a means for receiving radio frequency signaling associated with a set of multiple repetitions of a set of messages, the set of multiple repetitions of the set of messages including a respective set of multiple repetitions for each of the set of messages, where the set of messages includes the message. In some implementations, to support receiving the message via the backscattering from the passive wireless device and in accordance with the communications signature, the communications manager 720 may be configured as or otherwise support a means for extracting the message from the radio frequency signaling in accordance with the time domain code sequence.

In some implementations, to support extracting the message from the radio frequency signaling, the communications manager 720 may be configured as or otherwise support a means for multiplying each of the set of multiple repetitions of the set of messages by a conjugate of the time domain code sequence to obtain a set of multiple products. In some implementations, to support extracting the message from the radio frequency signaling, the communications manager 720 may be configured as or otherwise support a means for adding the set of multiple products together to obtain the message.

In some implementations, each message of the set of messages is associated with reflected signaling from a different passive reflective device. In some implementations, each passive wireless device is associated with a different time domain code sequence.

In some implementations, the time domain code sequence is an orthogonal cover code (OCC) sequence, a non-OCC sequence, or an asynchronous code sequence. In some implementations, the time domain code sequence is applied per bit, per group of bits, or per response from the passive wireless device.

In some implementations, to support receiving the indication of the communications signature, the communications manager 720 may be configured as or otherwise support a means for receiving an indication of a power scaling factor of the passive wireless device, where the communications signature includes the power scaling factor of the passive wireless device.

In some implementations, to support receiving the message via the backscattering from the passive wireless device and in accordance with the communications signature, the communications manager 720 may be configured as or otherwise support a means for receiving radio frequency signaling associated with a set of messages, where the set of messages includes the message. In some implementations, to support receiving the message via the backscattering from the passive wireless device and in accordance with the communications signature, the communications manager 720 may be configured as or otherwise support a means for extracting the message from the radio frequency signaling in accordance with a successive cancellation technique associated with the power scaling factor.

In some implementations, each message of the set of messages is associated with reflected signaling from a different passive reflective device. In some implementations, each passive wireless device is associated with a different power scaling factor.

In some implementations, the power scaling factor is associated with a first priority or a first quality of service (QOS) associated with the passive wireless device, or associated with a second priority or a second QoS associated with the message.

In some implementations, to support receiving the indication of the communications signature, the communications manager 720 may be configured as or otherwise support a means for receiving an indication of a power scaling factor of the source device, where the communications signature includes the power scaling factor of the source device, and where the power scaling factor of the source device is used in accordance with one or more other wireless devices using a same sub-channel as a sub-channel used by the source device and the reader device.

In some implementations, the power scaling factor of the source device is associated with the sub-channel used by the source device and the reader device, a first set of distances between the reader device and the one or more other wireless devices, a second set of distances between the passive wireless device and the one or more other wireless devices, or a transmit power used by the one or more other wireless devices, or any combination thereof.

In some implementations, the communications manager 720 may be configured as or otherwise support a means for measuring that a first set of sub-channels are occupied in accordance with an energy detection measurement at the reader device. In some implementations, the communications manager 720 may be configured as or otherwise support a means for selecting, from a second set of sub-channels, a sub-channel for the backscattered communications from the source device to the reader device via the passive wireless device, where the second set of sub-channels is associated with the first set of sub-channels in accordance with a mapping relationship between occupied sub-channels and available sub-channels.

Additionally, or alternatively, the communications manager 720 may support wireless communication at a source device in accordance with examples as disclosed herein. For example, the communications manager 720 may be configured as or otherwise support a means for transmitting an indication of a communications signature, from a set of communications signatures, that is specific to backscattered communications from the source device to a reader device via a passive wireless device, where the communications signature is associated with interference avoidance for the backscattered communications. The communications manager 720 may be configured as or otherwise support a means for transmitting, to the reader device via a backscattering from the passive wireless device, a message in accordance with the communications signature.

In some implementations, the communications manager 720 may be configured as or otherwise support a means for receiving an indication of a capability of the passive wireless device associated with the interference avoidance for the backscattered communications, where the communications signature is associated with the capability of the passive wireless device.

In some implementations, to support transmitting the indication of the communications signature, the communications manager 720 may be configured as or otherwise support a means for transmitting an indication of a time domain code sequence of the passive wireless device, where the communications signature includes the time domain code sequence of the passive wireless device.

In some implementations, to support transmitting the message in accordance with the communications signature, the communications manager 720 may be configured as or otherwise support a means for transmitting a set of multiple repetitions of the message, where the time domain code sequence is associated with a sequence of elements, and where a respective element of the sequence of elements is applied to each successive repetition of the set of multiple repetitions of the message.

In some implementations, the time domain code sequence is an orthogonal cover code (OCC) sequence, a non-OCC sequence, or an asynchronous code sequence. In some implementations, the time domain code sequence is applied per bit, per group of bits, or per response from the passive wireless device.

In some implementations, to support transmitting the indication of the communications signature, the communications manager 720 may be configured as or otherwise support a means for transmitting an indication of a power scaling factor of the passive wireless device, where the communications signature includes the power scaling factor of the passive wireless device.

In some implementations, the power scaling factor is associated with a first priority or a first quality of service (QOS) associated with the passive wireless device, or associated with a second priority or a second QoS associated with the message.

In some implementations, to support transmitting the indication of the communications signature, the communications manager 720 may be configured as or otherwise support a means for transmitting an indication of a bandwidth associated with the message, where a frequency domain filtering of the backscattered communications from the passive wireless device is associated with the indication of the bandwidth.

In some implementations, to support transmitting the indication of the communications signature, the communications manager 720 may be configured as or otherwise support a means for transmitting an indication of a power scaling factor of the source device, where the communications signature includes the power scaling factor of the source device, and where the power scaling factor of the source device is used in accordance with one or more other wireless devices using a same sub-channel as a sub-channel used by the source device and the reader device.

In some implementations, the power scaling factor of the source device is associated with the sub-channel used by the source device and the reader device, a first set of distances between the reader device and the one or more other wireless devices, a second set of distances between the passive wireless device and the one or more other wireless devices, or a transmit power used by the one or more other wireless devices, or any combination thereof.

In some implementations, the communications manager 720 may be configured as or otherwise support a means for measuring that a first set of sub-channels are occupied in accordance with an energy detection measurement at the reader device. In some implementations, the communications manager 720 may be configured as or otherwise support a means for selecting, from a second set of sub-channels, a sub-channel for the backscattered communications from the source device to the reader device via the passive wireless device, where the second set of sub-channels is associated with the first set of sub-channels in accordance with a mapping relationship between occupied sub-channels and available sub-channels.

In some implementations, the communications manager 720 may be configured to perform various operations (such as receiving, monitoring, transmitting) using or otherwise in cooperation with the transceiver 715, the one or more antennas 725, or any combination thereof. Although the communications manager 720 is illustrated as a component of the transceiver 715, in some implementations, one or more functions described with reference to the communications manager 720 may be supported by or performed by the transceiver 715, the processor 740, the memory 730, the code 735, or any combination thereof. For example, the code 735 may include instructions executable by the processor 740 to cause the device 705 to perform various aspects of interference reduction techniques between passive wireless devices as described herein, or the processor 740 and the memory 730 may be otherwise configured to perform or support such operations.

Figure 8:
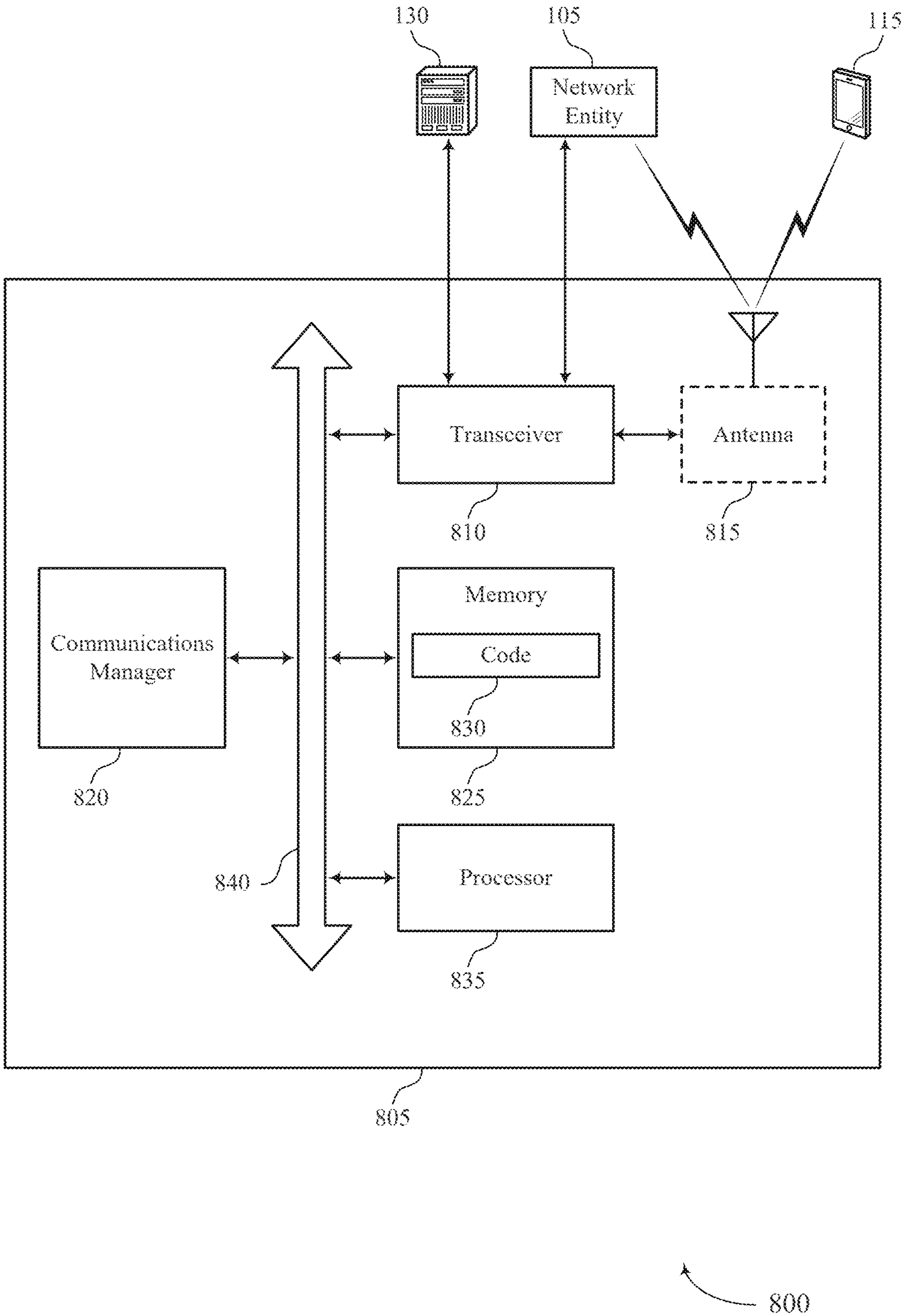

FIG. 8 shows a block diagram 800 of an example device 805 that supports interference reduction techniques between passive wireless devices. The device 805 may communicate with one or more network entities (such as one or more components of one or more network entities 105), one or more UEs 115, or any combination thereof, which may include communications over one or more wired interfaces, over one or more wireless interfaces, or any combination thereof. The device 805 may include components that support outputting and obtaining communications, such as a communications manager 820, a transceiver 810, an antenna 815, a memory 825, code 830, and a processor 835. These components may be in electronic communication or otherwise coupled (such as operatively, communicatively, functionally, electronically, electrically) via one or more buses (such as a bus 840).

The transceiver 810 may support bi-directional communications via wired links, wireless links, or both as described herein. In some implementations, the transceiver 810 may include a wired transceiver and may communicate bi-directionally with another wired transceiver. Additionally, or alternatively, in some implementations, the transceiver 810 may include a wireless transceiver and may communicate bi-directionally with another wireless transceiver. In some implementations, the device 805 may include one or more antennas 815, which may be capable of transmitting or receiving wireless transmissions (such as concurrently). The transceiver 810 also may include a modem to modulate signals, to provide the modulated signals for transmission (such as by one or more antennas 815, by a wired transmitter), to receive modulated signals (such as from one or more antennas 815, from a wired receiver), and to demodulate signals.

In some implementations, the transceiver 810 may include one or more interfaces, such as one or more interfaces coupled with the one or more antennas 815 that are configured to support various receiving or obtaining operations, or one or more interfaces coupled with the one or more antennas 815 that are configured to support various transmitting or outputting operations, or a combination thereof. In some implementations, the transceiver 810 may include or be configured for coupling with one or more processors or memory components that are operable to perform or support operations based on received or obtained information or signals, or to generate information or other signals for transmission or other outputting, or any combination thereof. In some implementations, the transceiver 810, or the transceiver 810 and the one or more antennas 815, or the transceiver 810 and the one or more antennas 815 and one or more processors or memory components (such as the processor 835, or the memory 825, or both), may be included in a chip or chip assembly that is installed in the device 805. In some implementations, the transceiver may be operable to support communications via one or more communications links (such as a communication link 125, a backhaul communication link 120, a midhaul communication link 162, a fronthaul communication link 168).

The memory 825 may include RAM and ROM. The memory 825 may store computer-readable, computer-executable code 830 including instructions that, when executed by the processor 835, cause the device 805 to perform various functions described herein. The code 830 may be stored in a non-transitory computer-readable medium such as system memory or another type of memory. In some implementations, the code 830 may not be directly executable by the processor 835 but may cause a computer (such as when compiled and executed) to perform functions described herein. In some implementations, the memory 825 may contain, among other things, a BIOS which may control basic hardware or software operation such as the interaction with peripheral components or devices.

The processor 835 may include an intelligent hardware device (such as a general-purpose processor, a DSP, an ASIC, a CPU, an FPGA, a microcontroller, a programmable logic device, discrete gate or transistor logic, a discrete hardware component, or any combination thereof). In some implementations, the processor 835 may be configured to operate a memory array using a memory controller. In some other implementations, a memory controller may be integrated into the processor 835. The processor 835 may be configured to execute computer-readable instructions stored in a memory (such as the memory 825) to cause the device 805 to perform various functions (such as functions or tasks supporting interference reduction techniques between passive wireless devices). For example, the device 805 or a component of the device 805 may include a processor 835 and memory 825 coupled with the processor 835, the processor 835 and memory 825 configured to perform various functions described herein. The processor 835 may be an example of a cloud-computing platform (such as one or more physical nodes and supporting software such as operating systems, virtual machines, or container instances) that may host the functions (such as by executing code 830) to perform the functions of the device 805. The processor 835 may be any one or more suitable processors capable of executing scripts or instructions of one or more software programs stored in the device 805 (such as within the memory 825). In some implementations, the processor 835 may be a component of a processing system.

A processing system may generally refer to a system or series of machines or components that receives inputs and processes the inputs to produce a set of outputs (which may be passed to other systems or components of, for example, the device 805). For example, a processing system of the device 805 may refer to a system including the various other components or subcomponents of the device 805, such as the processor 835, or the transceiver 810, or the communications manager 820, or other components or combinations of components of the device 805. The processing system of the device 805 may interface with other components of the device 805, and may process information received from other components (such as inputs or signals) or output information to other components. For example, a chip or modem of the device 805 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations.

In some implementations, the one or more interfaces may refer to an interface between the processing system of the chip or modem and a transmitter, such that the device 805 may transmit information output from the chip or modem. Additionally, or alternatively, in some implementations, the one or more interfaces may refer to an interface between the processing system of the chip or modem and a receiver, such that the device 805 may obtain information or signal inputs, and the information may be passed to the processing system.

A person having ordinary skill in the art will readily recognize that a first interface also may obtain information or signal inputs, and a second interface also may output information or signal outputs.

In some implementations, a bus 840 may support communications of (such as within) a protocol layer of a protocol stack. In some implementations, a bus 840 may support communications associated with a logical channel of a protocol stack (such as between protocol layers of a protocol stack), which may include communications performed within a component of the device 805, or between different components of the device 805 that may be co-located or located in different locations (such as where the device 805 may refer to a system in which one or more of the communications manager 820, the transceiver 810, the memory 825, the code 830, and the processor 835 may be located in one of the different components or divided between different components).

In some implementations, the communications manager 820 may manage aspects of communications with a core network 130 (such as via one or more wired or wireless backhaul links). For example, the communications manager 820 may manage the transfer of data communications for client devices, such as one or more UEs 115. In some implementations, the communications manager 820 may manage communications with other network entities 105, and may include a controller or scheduler for controlling communications with UEs 115 in cooperation with other network entities 105. In some implementations, the communications manager 820 may support an X2 interface within an LTE/LTE-A wireless communications network technology to provide communication between network entities 105.

The communications manager 820 may support wireless communication at a passive wireless device in accordance with examples as disclosed herein. For example, the communications manager 820 may be configured as or otherwise support a means for receiving an indication of a communications signature, from a set of communications signatures, that is specific to backscattered communications from a source device to a reader device via the passive wireless device, where the communications signature is associated with interference avoidance for the backscattered communications. The communications manager 820 may be configured as or otherwise support a means for receiving a first message from the source device. The communications manager 820 may be configured as or otherwise support a means for transmitting, to the reader device, a second message via a backscattering of the first message and in accordance with the communications signature.

Additionally, or alternatively, the communications manager 820 may support wireless communication at a reader device in accordance with examples as disclosed herein. For example, the communications manager 820 may be configured as or otherwise support a means for receiving an indication of a communications signature, from a set of communications signatures, that is specific to backscattered communications from a source device to the reader device via a passive wireless device, where the communications signature is associated with interference avoidance for the backscattered communications. The communications manager 820 may be configured as or otherwise support a means for receiving, via a backscattering from the passive wireless device, a message in accordance with the communications signature.

Additionally, or alternatively, the communications manager 820 may support wireless communication at a source device in accordance with examples as disclosed herein. For example, the communications manager 820 may be configured as or otherwise support a means for transmitting an indication of a communications signature, from a set of communications signatures, that is specific to backscattered communications from the source device to a reader device via a passive wireless device, where the communications signature is associated with interference avoidance for the backscattered communications. The communications manager 820 may be configured as or otherwise support a means for transmitting, to the reader device via a backscattering from the passive wireless device, a message in accordance with the communications signature.

In some implementations, the communications manager 820 may be configured to perform various operations (such as receiving, obtaining, monitoring, outputting, transmitting) using or otherwise in cooperation with the transceiver 810, the one or more antennas 815 (such as where applicable), or any combination thereof. Although the communications manager 820 is illustrated as a separate component, in some implementations, one or more functions described with reference to the communications manager 820 may be supported by or performed by the transceiver 810, the processor 835, the memory 825, the code 830, or any combination thereof. For example, the code 830 may include instructions executable by the processor 835 to cause the device 805 to perform various aspects of interference reduction techniques between passive wireless devices as described herein, or the processor 835 and the memory 825 may be otherwise configured to perform or support such operations.

Figure 9:
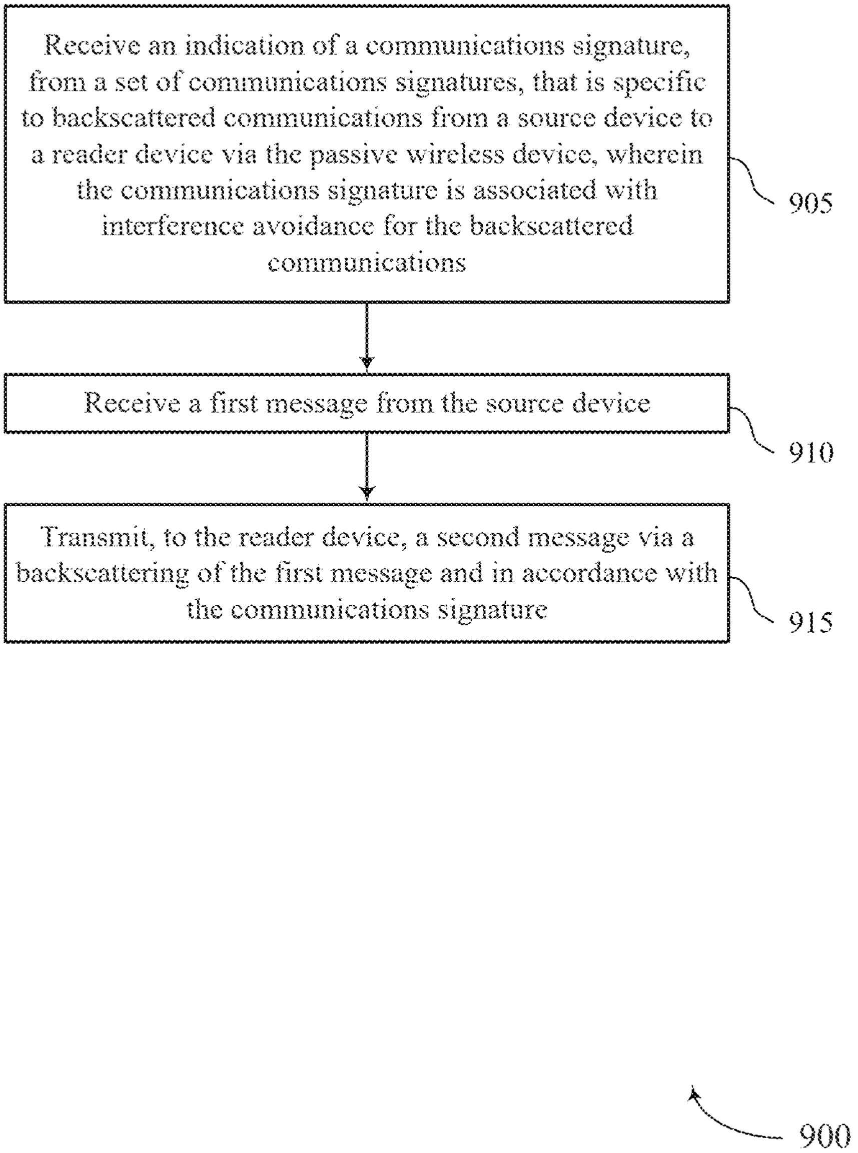
FIGS. 9-11 show flowcharts illustrating methods that support interference reduction techniques between passive wireless devices.

FIG. 9 shows a flowchart illustrating a method 900 that supports interference reduction techniques between passive wireless devices. The operations of the method 900 may be implemented by a UE or a network entity or its components as described herein. For example, the operations of the method 900 may be performed by a UE 115 or a network entity as described with reference to FIGS. 1-8. In some implementations, a UE or a network entity may execute a set of instructions to control the functional elements of the UE or the network entity to perform the described functions. Additionally, or alternatively, the UE or the network entity may perform aspects of the described functions using special-purpose hardware.

At 905, the method may include receiving an indication of a communications signature, from a set of communications signatures, that is specific to backscattered communications from a source device to a reader device via the passive wireless device, where the communications signature is associated with interference avoidance for the backscattered communications. The operations of 905 may be performed in accordance with examples as disclosed herein.

At 910, the method may include receiving a first message from the source device. The operations of 910 may be performed in accordance with examples as disclosed herein.

At 915, the method may include transmitting, to the reader device, a second message via a backscattering of the first message and in accordance with the communications signature. The operations of 915 may be performed in accordance with examples as disclosed herein.

Figure 10:
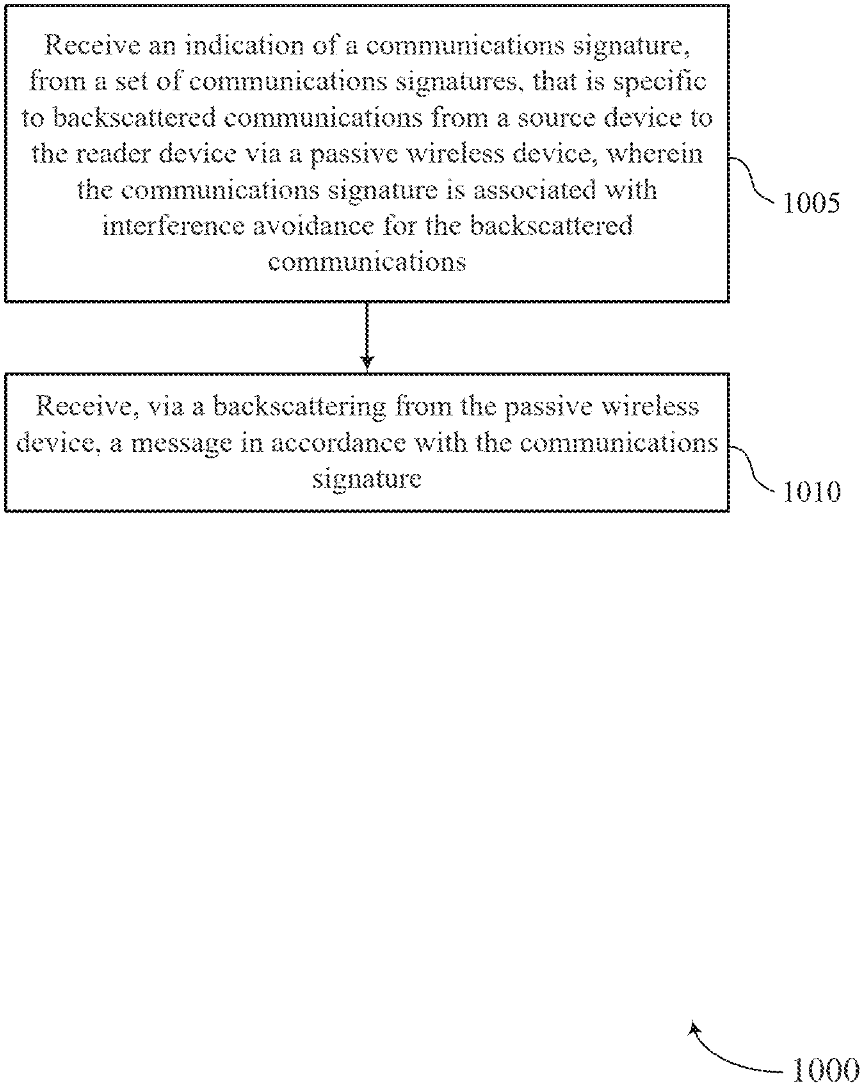

FIG. 10 shows a flowchart illustrating a method 1000 that supports interference reduction techniques between passive wireless devices. The operations of the method 1000 may be implemented by a UE or a network entity or its components as described herein. For example, the operations of the method 1000 may be performed by a UE 115 or a network entity as described with reference to FIGS. 1-8. In some implementations, a UE or a network entity may execute a set of instructions to control the functional elements of the UE or the network entity to perform the described functions. Additionally, or alternatively, the UE or the network entity may perform aspects of the described functions using special-purpose hardware.

At 1005, the method may include receiving an indication of a communications signature, from a set of communications signatures, that is specific to backscattered communications from a source device to the reader device via a passive wireless device, where the communications signature is associated with interference avoidance for the backscattered communications. The operations of 1005 may be performed in accordance with examples as disclosed herein.

At 1010, the method may include receiving, via a backscattering from the passive wireless device, a message in accordance with the communications signature. The operations of 1010 may be performed in accordance with examples as disclosed herein.

Figure 11:
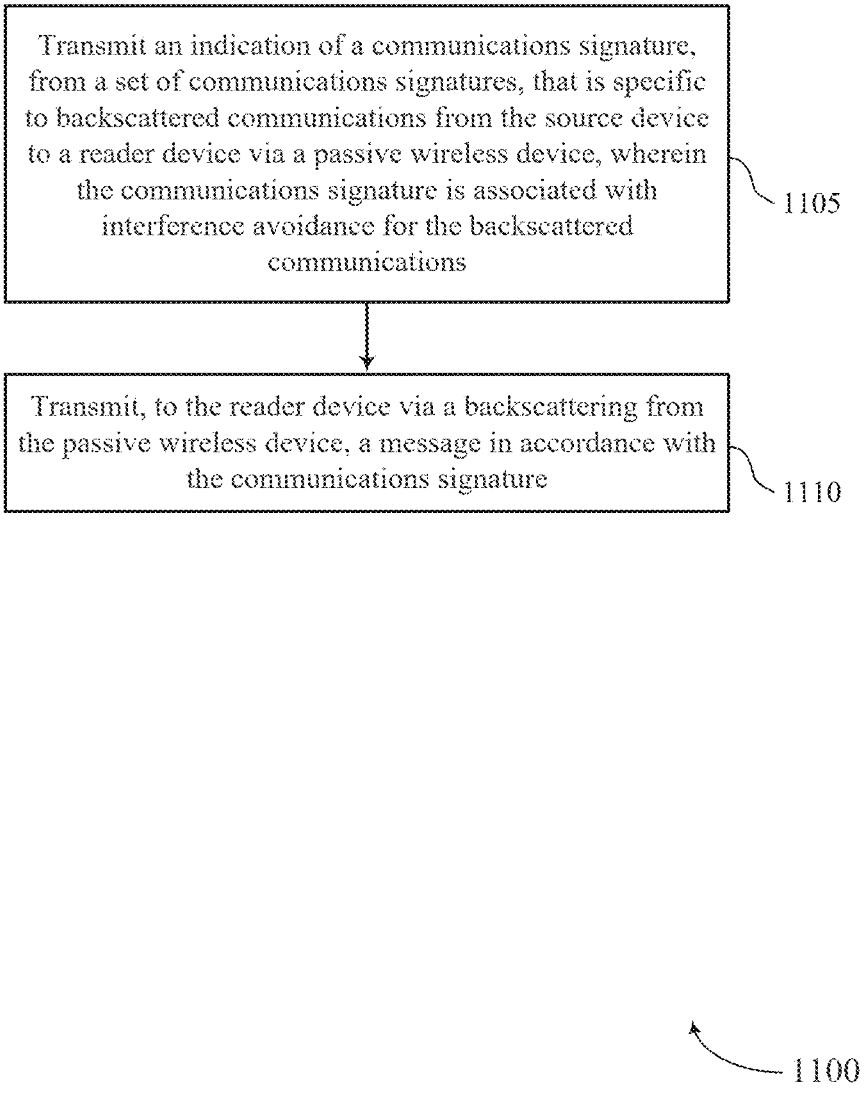

FIG. 11 shows a flowchart illustrating a method 1100 that supports interference reduction techniques between passive wireless devices. The operations of the method 1100 may be implemented by a UE or a network entity or its components as described herein. For example, the operations of the method 1100 may be performed by a UE 115 or a network entity as described with reference to FIGS. 1-8. In some implementations, a UE or a network entity may execute a set of instructions to control the functional elements of the UE or the network entity to perform the described functions. Additionally, or alternatively, the UE or the network entity may perform aspects of the described functions using special-purpose hardware.

At 1105, the method may include transmitting an indication of a communications signature, from a set of communications signatures, that is specific to backscattered communications from the source device to a reader device via a passive wireless device, where the communications signature is associated with interference avoidance for the backscattered communications. The operations of 1105 may be performed in accordance with examples as disclosed herein.

At 1110, the method may include transmitting, to the reader device via a backscattering from the passive wireless device, a message in accordance with the communications signature. The operations of 1110 may be performed in accordance with examples as disclosed herein.

The following provides an overview of some aspects of the present disclosure:

Aspect 1: A method for wireless communication at a passive wireless device, including: receiving an indication of a communications signature, from a set of communications signatures, that is specific to backscattered communications from a source device to a reader device via the passive wireless device, where the communications signature is associated with interference avoidance for the backscattered communications; receiving a first message from the source device; and transmitting, to the reader device, a second message via a backscattering of the first message and in accordance with the communications signature.

Aspect 2: The method of aspect 1, further including: transmitting an indication of a capability of the passive wireless device associated with the interference avoidance for the backscattered communications, where the communications signature is associated with the capability of the passive wireless device.

Aspect 3: The method of any of aspects 1-2, where receiving the indication of the communications signature includes: receiving an indication of a time domain code sequence, where the communications signature includes the time domain code sequence.

Aspect 4: The method of aspect 3, where transmitting the second message via the backscattering of the first message and in accordance with the communications signature includes: applying the time domain code sequence to a set of multiple repetitions of the first message.

Aspect 5: The method of aspect 4, where the time domain code sequence is associated with a sequence of elements, and a respective element of the sequence of elements is applied to each successive repetition of the set of multiple repetitions of the first message.

Aspect 6: The method of any of aspects 4-5, where the time domain code sequence is an OCC sequence, a non-OCC sequence, or an asynchronous code sequence.

Aspect 7: The method of any of aspects 4-6, where the time domain code sequence is applied per bit, per group of bits, or per response from the passive wireless device.

Aspect 8: The method of any of aspects 1-7, where receiving the indication of the communications signature includes: receiving an indication of a power scaling factor, where the communications signature includes the power scaling factor.

Aspect 9: The method of aspect 8, where transmitting the second message via the backscattering of the first message and in accordance with the communications signature includes: applying the power scaling factor to the second message, where the communications signature includes the power scaling factor.

Aspect 10: The method of aspect 9, where the power scaling factor is associated with a first priority or a first QoS associated with the passive wireless device, or associated with a second priority or a second QoS associated with the first message.

Aspect 11: The method of any of aspects 1-10, further including: receiving an indication of a bandwidth associated with the first message, where a frequency domain filtering of the backscattered communications from the passive wireless device is associated with the indication of the bandwidth.

Aspect 12: The method of aspect 11, further including: performing energy harvesting using first radio frequency energy received within the bandwidth associated with the first message and using second radio frequency energy received outside of the bandwidth associated with the first message; and filtering the second radio frequency energy received outside of the bandwidth associated with the first message to focus the backscattering of the first message to the bandwidth associated with the first message.

Aspect 13: The method of any of aspects 1-12, where the first message corresponds to a first radio wave associated with a first set of bits and the second message corresponds to a second radio wave associated with a second set of bits, and the backscattering by the passive wireless device is associated with an amplitude shift keying modulation of the first set of bits with the second set of bits via selective reflection by the passive wireless device.

Aspect 14: A method for wireless communication at a reader device, including: receiving an indication of a communications signature, from a set of communications signatures, that is specific to backscattered communications from a source device to the reader device via a passive wireless device, where the communications signature is associated with interference avoidance for the backscattered communications; and receiving, via a backscattering from the passive wireless device, a message in accordance with the communications signature.

Aspect 15: The method of aspect 14, where receiving the indication of the communications signature includes: receiving an indication of a time domain code sequence of the passive wireless device, where the communications signature includes the time domain code sequence of the passive wireless device.

Aspect 16: The method of aspect 15, where receiving the message via the backscattering from the passive wireless device and in accordance with the communications signature includes: receiving radio frequency signaling associated with a set of multiple repetitions of a set of messages, the set of multiple repetitions of the set of messages including a respective set of multiple repetitions for each of the set of messages, where the set of messages includes the message; and extracting the message from the radio frequency signaling in accordance with the time domain code sequence.

Aspect 17: The method of aspect 16, where extracting the message from the radio frequency signaling includes: multiplying each of the set of multiple repetitions of the set of messages by a conjugate of the time domain code sequence to obtain a set of multiple products; and adding the set of multiple products together to obtain the message.

Aspect 18: The method of any of aspects 16-17, where each message of the set of messages is associated with reflected signaling from a different passive reflective device, and each passive wireless device is associated with a different time domain code sequence.

Aspect 19: The method of any of aspects 16-18, where the time domain code sequence is an OCC sequence, a non-OCC sequence, or an asynchronous code sequence, and the time domain code sequence is applied per bit, per group of bits, or per response from the passive wireless device.

Aspect 20: The method of any of aspects 14-19, where receiving the indication of the communications signature includes: receiving an indication of a power scaling factor of the passive wireless device, where the communications signature includes the power scaling factor of the passive wireless device.

Aspect 21: The method of aspect 20, where receiving the message via the backscattering from the passive wireless device and in accordance with the communications signature includes: receiving radio frequency signaling associated with a set of messages, where the set of messages includes the message; and extracting the message from the radio frequency signaling in accordance with a successive cancellation technique associated with the power scaling factor.

Aspect 22: The method of aspect 21, where each message of the set of messages is associated with reflected signaling from a different passive reflective device, and each passive wireless device is associated with a different power scaling factor.

Aspect 23: The method of any of aspects 21-22, where the power scaling factor is associated with a first priority or a first QoS associated with the passive wireless device, or associated with a second priority or a second QoS associated with the message.

Aspect 24: The method of any of aspects 14-23, where receiving the indication of the communications signature includes: receiving an indication of a power scaling factor of the source device, where the communications signature includes the power scaling factor of the source device, and where the power scaling factor of the source device is used in accordance with one or more other wireless devices using a same sub-channel as a sub-channel used by the source device and the reader device.

Aspect 25: The method of aspect 24, where the power scaling factor of the source device is associated with the sub-channel used by the source device and the reader device, a first set of distances between the reader device and the one or more other wireless devices, a second set of distances between the passive wireless device and the one or more other wireless devices, or a transmit power used by the one or more other wireless devices, or any combination thereof.

Aspect 26: The method of any of aspects 14-25, further including: measuring that a first set of sub-channels are occupied in accordance with an energy detection measurement at the reader device; and selecting, from a second set of sub-channels, a sub-channel for the backscattered communications from the source device to the reader device via the passive wireless device, where the second set of sub-channels is associated with the first set of sub-channels in accordance with a mapping relationship between occupied sub-channels and available sub-channels.

Aspect 27: A method for wireless communication at a source device, including: transmitting an indication of a communications signature, from a set of communications signatures, that is specific to backscattered communications from the source device to a reader device via a passive wireless device, where the communications signature is associated with interference avoidance for the backscattered communications; and transmitting, to the reader device via a backscattering from the passive wireless device, a message in accordance with the communications signature.

Aspect 28: The method of aspect 27, further including: receiving an indication of a capability of the passive wireless device associated with the interference avoidance for the backscattered communications, where the communications signature is associated with the capability of the passive wireless device.

Aspect 29: The method of any of aspects 27-28, where transmitting the indication of the communications signature includes: transmitting an indication of a time domain code sequence of the passive wireless device, where the communications signature includes the time domain code sequence of the passive wireless device.

Aspect 30: The method of aspect 29, where transmitting the message in accordance with the communications signature includes: transmitting a set of multiple repetitions of the message, where the time domain code sequence is associated with a sequence of elements, and where a respective element of the sequence of elements is applied to each successive repetition of the set of multiple repetitions of the message.

Aspect 31: The method of any of aspects 29-30, where the time domain code sequence is an OCC sequence, a non-OCC sequence, or an asynchronous code sequence, and the time domain code sequence is applied per bit, per group of bits, or per response from the passive wireless device.

Aspect 32: The method of any of aspects 27-31, where transmitting the indication of the communications signature includes: transmitting an indication of a power scaling factor of the passive wireless device, where the communications signature includes the power scaling factor of the passive wireless device.

Aspect 33: The method of aspect 32, where the power scaling factor is associated with a first priority or a first QoS associated with the passive wireless device, or associated with a second priority or a second QoS associated with the message.

Aspect 34: The method of any of aspects 27-33, where transmitting the indication of the communications signature includes: transmitting an indication of a bandwidth associated with the message, where a frequency domain filtering of the backscattered communications from the passive wireless device is associated with the indication of the bandwidth.

Aspect 35: The method of any of aspects 27-34, where transmitting the indication of the communications signature includes: transmitting an indication of a power scaling factor of the source device, where the communications signature includes the power scaling factor of the source device, and where the power scaling factor of the source device is used in accordance with one or more other wireless devices using a same sub-channel as a sub-channel used by the source device and the reader device.

Aspect 36: The method of aspect 35, where the power scaling factor of the source device is associated with the sub-channel used by the source device and the reader device, a first set of distances between the reader device and the one or more other wireless devices, a second set of distances between the passive wireless device and the one or more other wireless devices, or a transmit power used by the one or more other wireless devices, or any combination thereof.

Aspect 37: The method of any of aspects 27-36, further including: measuring that a first set of sub-channels are occupied in accordance with an energy detection measurement at the reader device; and selecting, from a second set of sub-channels, a sub-channel for the backscattered communications from the source device to the reader device via the passive wireless device, where the second set of sub-channels is associated with the first set of sub-channels in accordance with a mapping relationship between occupied sub-channels and available sub-channels.

Aspect 38: An apparatus for wireless communication at a passive wireless device, including: one or more interfaces configured to: obtain an indication of a communications signature, from a set of communications signatures, that is specific to backscattered communications from a source device to a reader device via the passive wireless device, where the communications signature is associated with interference avoidance for the backscattered communications; obtain a first message from the source device; and output, to the reader device, a second message via a backscattering of the first message and in accordance with the communications signature.

Aspect 39: The apparatus of aspect 38, where the one or more interfaces are further configured to: output an indication of a capability of the passive wireless device associated with the interference avoidance for the backscattered communications, where the communications signature is associated with the capability of the passive wireless device.

Aspect 40: The apparatus of any of aspects 38-39, where, to obtain the indication of the communications signature, the one or more interfaces are further configured to: obtain an indication of a time domain code sequence, where the communications signature includes the time domain code sequence.

Aspect 41: The apparatus of aspect 40, further including a processing system, where, to output the second message via the backscattering of the first message and in accordance with the communications signature, the processing system is configured to: apply the time domain code sequence to a set of multiple repetitions of the first message, where the time domain code sequence is associated with a sequence of elements, and where a respective element of the sequence of elements is applied to each successive repetition of the set of multiple repetitions of the first message.

Aspect 42: The apparatus of aspect 41, where the time domain code sequence is an OCC sequence, a non-OCC sequence, or an asynchronous code sequence, and the time domain code sequence is applied per bit, per group of bits, or per response from the passive wireless device.

Aspect 43: The apparatus of any of aspects 38-42, where, to obtain the indication of the communications signature, the one or more interfaces are further configured to: obtain an indication of a power scaling factor, where the communications signature includes the power scaling factor.

Aspect 44: The apparatus of aspect 43, further including a processing system, where, to output the second message via the backscattering of the first message and in accordance with the communications signature, the processing system is configured to: apply the power scaling factor to the second message, where the communications signature includes the power scaling factor, where the power scaling factor is associated with a first priority or a first QoS associated with the passive wireless device, or associated with a second priority or a second QoS associated with the first message.

Aspect 45: The apparatus of any of aspects 38-44, where: the one or more interfaces are further configured to: obtain an indication of a bandwidth associated with the first message, where a frequency domain filtering of the backscattered communications from the passive wireless device is associated with the indication of the bandwidth; and a processing system is configured to: perform energy harvesting using first radio frequency energy received within the bandwidth associated with the first message and using second radio frequency energy received outside of the bandwidth associated with the first message; and filter the second radio frequency energy received outside of the bandwidth associated with the first message to focus the backscattering of the first message to the bandwidth associated with the first message.

Aspect 46: The apparatus of any of aspects 38-45, where: the first message corresponds to a first radio wave associated with a first set of bits and the second message corresponds to a second radio wave associated with a second set of bits; and the backscattering by the passive wireless device is associated with an amplitude shift keying modulation of the first set of bits with the second set of bits via selective reflection by the passive wireless device.

Aspect 47: An apparatus for wireless communication at a reader device, including: one or more interfaces configured to: obtain an indication of a communications signature, from a set of communications signatures, that is specific to backscattered communications from a source device to the reader device via a passive wireless device, where the communications signature is associated with interference avoidance for the backscattered communications; and obtain, via a backscattering from the passive wireless device, a message in accordance with the communications signature.

Aspect 48: The apparatus of aspect 47, where, to obtain the indication of the communications signature, the one or more interfaces are further configured to: obtain an indication of a time domain code sequence of the passive wireless device, where the communications signature includes the time domain code sequence of the passive wireless device.

Aspect 49: The apparatus of aspect 48, where, to obtain the message via the backscattering from the passive wireless device and in accordance with the communications signature, the one or more interfaces are further configured to: obtain radio frequency signaling associated with a set of multiple repetitions of a set of messages, the set of multiple repetitions of the set of messages including a respective set of multiple repetitions for each of the set of messages, where the set of messages includes the message; and extract the message from the radio frequency signaling in accordance with the time domain code sequence.

Aspect 50: The apparatus of aspect 49, further including a processing system, where, to extract the message from the radio frequency signaling, the processing system is configured to: multiply each of the set of multiple repetitions of the set of messages by a conjugate of the time domain code sequence to obtain a set of multiple products; and add the set of multiple products together to obtain the message.

Aspect 51: The apparatus of any of aspects 49-50, where each message of the set of messages is associated with reflected signaling from a different passive reflective device, and each passive wireless device is associated with a different time domain code sequence, and the time domain code sequence is an OCC sequence, a non-OCC sequence, or an asynchronous code sequence, and the time domain code sequence is applied per bit, per group of bits, or per response from the passive wireless device.

Aspect 52: The apparatus of any of aspects 47-51, where, to obtain the indication of the communications signature, the one or more interfaces are further configured to: obtain an indication of a power scaling factor of the passive wireless device, where the communications signature includes the power scaling factor of the passive wireless device.

Aspect 53: The apparatus of aspect 52, where, to obtain the message via the backscattering from the passive wireless device and in accordance with the communications signature, the one or more interfaces are further configured to: obtain radio frequency signaling associated with a set of messages, where the set of messages includes the message, where each message of the set of messages is associated with reflected signaling from a different passive reflective device, and where each passive wireless device is associated with a different power scaling factor; and extract the message from the radio frequency signaling in accordance with a successive cancellation technique associated with the power scaling factor.

Aspect 54: The apparatus of aspect 53, where the power scaling factor is associated with a first priority or a first QoS associated with the passive wireless device, or associated with a second priority or a second QoS associated with the message.

Aspect 55: The apparatus of any of aspects 47-54, where, to obtain the indication of the communications signature, the one or more interfaces are further configured to: obtain an indication of a power scaling factor of the source device, where the communications signature includes the power scaling factor of the source device, and where the power scaling factor of the source device is used in accordance with one or more other wireless devices using a same sub-channel as a sub-channel used by the source device and the reader device, where the power scaling factor of the source device is associated with the sub-channel used by the source device and the reader device, a first set of distances between the reader device and the one or more other wireless devices, a second set of distances between the passive wireless device and the one or more other wireless devices, or a transmit power used by the one or more other wireless devices, or any combination thereof.

Aspect 56: The apparatus of any of aspects 47-55, further including a processing system configured to: measure that a first set of sub-channels are occupied in accordance with an energy detection measurement at the reader device; and select, from a second set of sub-channels, a sub-channel for the backscattered communications from the source device to the reader device via the passive wireless device, where the second set of sub-channels is associated with the first set of sub-channels in accordance with a mapping relationship between occupied sub-channels and available sub-channels.

Aspect 57: An apparatus for wireless communication at a source device, including: one or more interfaces configured to: output an indication of a communications signature, from a set of communications signatures, that is specific to backscattered communications from the source device to a reader device via a passive wireless device, where the communications signature is associated with interference avoidance for the backscattered communications; and output, to the reader device via a backscattering from the passive wireless device, a message in accordance with the communications signature.

Aspect 58: The apparatus of aspect 57, where the one or more interfaces are further configured to: obtain an indication of a capability of the passive wireless device associated with the interference avoidance for the backscattered communications, where the communications signature is associated with the capability of the passive wireless device.

Aspect 59: The apparatus of any of aspects 57-58, where, to output the indication of the communications signature, the one or more interfaces are further configured to: output an indication of a time domain code sequence of the passive wireless device, where the communications signature includes the time domain code sequence of the passive wireless device.

Aspect 60: The apparatus of aspect 59, where, to output the message in accordance with the communications signature, the one or more interfaces are further configured to: output a set of multiple repetitions of the message, where the time domain code sequence is associated with a sequence of elements, and where a respective element of the sequence of elements is applied to each successive repetition of the set of multiple repetitions of the message.

Aspect 61: The apparatus of any of aspects 59-60, where the time domain code sequence is an OCC sequence, a non-OCC sequence, or an asynchronous code sequence, and the time domain code sequence is applied per bit, per group of bits, or per response from the passive wireless device.

Aspect 62: The apparatus of any of aspects 57-61, where, to output the indication of the communications signature, the one or more interfaces are further configured to: output an indication of a power scaling factor of the passive wireless device, where the communications signature includes the power scaling factor of the passive wireless device, where the power scaling factor is associated with a first priority or a first QoS associated with the passive wireless device, or associated with a second priority or a second QoS associated with the message.

Aspect 63: The apparatus of any of aspects 57-62, where, to output the indication of the communications signature, the one or more interfaces are further configured to: output an indication of a bandwidth associated with the message, where a frequency domain filtering of the backscattered communications from the passive wireless device is associated with the indication of the bandwidth.

Aspect 64: The apparatus of any of aspects 57-63, where, to output the indication of the communications signature, the one or more interfaces are further configured to: output an indication of a power scaling factor of the source device, where the communications signature includes the power scaling factor of the source device, and where the power scaling factor of the source device is used in accordance with one or more other wireless devices using a same sub-channel as a sub-channel used by the source device and the reader device.

Aspect 65: The apparatus of aspect 64, where the power scaling factor of the source device is associated with the sub-channel used by the source device and the reader device, a first set of distances between the reader device and the one or more other wireless devices, a second set of distances between the passive wireless device and the one or more other wireless devices, or a transmit power used by the one or more other wireless devices, or any combination thereof.

Aspect 66: The apparatus of any of aspects 57-65, further including a processing system configured to: measure that a first set of sub-channels are occupied in accordance with an energy detection measurement at the reader device; and select, from a second set of sub-channels, a sub-channel for the backscattered communications from the source device to the reader device via the passive wireless device, where the second set of sub-channels is associated with the first set of sub-channels in accordance with a mapping relationship between occupied sub-channels and available sub-channels.

Aspect 67: An apparatus for wireless communication at a passive wireless device, including: means for receiving an indication of a communications signature, from a set of communications signatures, that is specific to backscattered communications from a source device to a reader device via the passive wireless device, where the communications signature is associated with interference avoidance for the backscattered communications; means for receiving a first message from the source device; and means for transmitting, to the reader device, a second message via a backscattering of the first message and in accordance with the communications signature.

Aspect 68: The apparatus of aspect 67, further including: means for transmitting an indication of a capability of the passive wireless device associated with the interference avoidance for the backscattered communications, where the communications signature is associated with the capability of the passive wireless device.

Aspect 69: The apparatus of any of aspects 67-68, where the means for receiving the indication of the communications signature include: means for receiving an indication of a time domain code sequence, where the communications signature includes the time domain code sequence.

Aspect 70: The apparatus of aspect 69, where the means for transmitting the second message via the backscattering of the first message and in accordance with the communications signature include: means for applying the time domain code sequence to a set of multiple repetitions of the first message.

Aspect 71: The apparatus of aspect 70, where the time domain code sequence is associated with a sequence of elements, and a respective element of the sequence of elements is applied to each successive repetition of the set of multiple repetitions of the first message.

Aspect 72: The apparatus of any of aspects 70-71, where the time domain code sequence is an OCC sequence, a non-OCC sequence, or an asynchronous code sequence.

Aspect 73: The apparatus of any of aspects 70-72, where the time domain code sequence is applied per bit, per group of bits, or per response from the passive wireless device.

Aspect 74: The apparatus of any of aspects 67-73, where the means for receiving the indication of the communications signature include: means for receiving an indication of a power scaling factor, where the communications signature includes the power scaling factor.

Aspect 75: The apparatus of aspect 74, where the means for transmitting the second message via the backscattering of the first message and in accordance with the communications signature include: means for applying the power scaling factor to the second message, where the communications signature includes the power scaling factor.

Aspect 76: The apparatus of aspect 75, where the power scaling factor is associated with a first priority or a first QoS associated with the passive wireless device, or associated with a second priority or a second QoS associated with the first message.

Aspect 77: The apparatus of any of aspects 67-76, further including: means for receiving an indication of a bandwidth associated with the first message, where a frequency domain filtering of the backscattered communications from the passive wireless device is associated with the indication of the bandwidth.

Aspect 78: The apparatus of aspect 77, further including: means for performing energy harvesting using first radio frequency energy received within the bandwidth associated with the first message and using second radio frequency energy received outside of the bandwidth associated with the first message; and means for filtering the second radio frequency energy received outside of the bandwidth associated with the first message to focus the backscattering of the first message to the bandwidth associated with the first message.

Aspect 79: The apparatus of any of aspects 67-78, where the first message corresponds to a first radio wave associated with a first set of bits and the second message corresponds to a second radio wave associated with a second set of bits, and the backscattering by the passive wireless device is associated with an amplitude shift keying modulation of the first set of bits with the second set of bits via selective reflection by the passive wireless device.

Aspect 80: An apparatus for wireless communication at a reader device, including: means for receiving an indication of a communications signature, from a set of communications signatures, that is specific to backscattered communications from a source device to the reader device via a passive wireless device, where the communications signature is associated with interference avoidance for the backscattered communications; and means for receiving, via a backscattering from the passive wireless device, a message in accordance with the communications signature.

Aspect 81: The apparatus of aspect 80, where the means for receiving the indication of the communications signature include: means for receiving an indication of a time domain code sequence of the passive wireless device, where the communications signature includes the time domain code sequence of the passive wireless device.

Aspect 82: The apparatus of aspect 81, where the means for receiving the message via the backscattering from the passive wireless device and in accordance with the communications signature include: means for receiving radio frequency signaling associated with a set of multiple repetitions of a set of messages, the set of multiple repetitions of the set of messages including a respective set of multiple repetitions for each of the set of messages, where the set of messages includes the message; and means for extracting the message from the radio frequency signaling in accordance with the time domain code sequence.

Aspect 83: The apparatus of aspect 82, where the means for extracting the message from the radio frequency signaling include: means for multiplying each of the set of multiple repetitions of the set of messages by a conjugate of the time domain code sequence to obtain a set of multiple products; and means for adding the set of multiple products together to obtain the message.

Aspect 84: The apparatus of any of aspects 82-83, where each message of the set of messages is associated with reflected signaling from a different passive reflective device, and each passive wireless device is associated with a different time domain code sequence.

Aspect 85: The apparatus of any of aspects 82-84, where the time domain code sequence is an OCC sequence, a non-OCC sequence, or an asynchronous code sequence, and the time domain code sequence is applied per bit, per group of bits, or per response from the passive wireless device.

Aspect 86: The apparatus of any of aspects 80-85, where the means for receiving the indication of the communications signature include: means for receiving an indication of a power scaling factor of the passive wireless device, where the communications signature includes the power scaling factor of the passive wireless device.

Aspect 87: The apparatus of aspect 86, where the means for receiving the message via the backscattering from the passive wireless device and in accordance with the communications signature include: means for receiving radio frequency signaling associated with a set of messages, where the set of messages includes the message; and means for extracting the message from the radio frequency signaling in accordance with a successive cancellation technique associated with the power scaling factor.

Aspect 88: The apparatus of aspect 87, where each message of the set of messages is associated with reflected signaling from a different passive reflective device, and each passive wireless device is associated with a different power scaling factor.

Aspect 89: The apparatus of any of aspects 87-88, where the power scaling factor is associated with a first priority or a first QoS associated with the passive wireless device, or associated with a second priority or a second QoS associated with the message.

Aspect 90: The apparatus of any of aspects 80-89, where the means for receiving the indication of the communications signature include: means for receiving an indication of a power scaling factor of the source device, where the communications signature includes the power scaling factor of the source device, and where the power scaling factor of the source device is used in accordance with one or more other wireless devices using a same sub-channel as a sub-channel used by the source device and the reader device.

Aspect 91: The apparatus of aspect 90, where the power scaling factor of the source device is associated with the sub-channel used by the source device and the reader device, a first set of distances between the reader device and the one or more other wireless devices, a second set of distances between the passive wireless device and the one or more other wireless devices, or a transmit power used by the one or more other wireless devices, or any combination thereof.

Aspect 92: The apparatus of any of aspects 80-91, further including: means for measuring that a first set of sub-channels are occupied in accordance with an energy detection measurement at the reader device; and means for selecting, from a second set of sub-channels, a sub-channel for the backscattered communications from the source device to the reader device via the passive wireless device, where the second set of sub-channels is associated with the first set of sub-channels in accordance with a mapping relationship between occupied sub-channels and available sub-channels.

Aspect 93: An apparatus for wireless communication at a source device, including: means for transmitting an indication of a communications signature, from a set of communications signatures, that is specific to backscattered communications from the source device to a reader device via a passive wireless device, where the communications signature is associated with interference avoidance for the backscattered communications; and means for transmitting, to the reader device via a backscattering from the passive wireless device, a message in accordance with the communications signature.

Aspect 94: The apparatus of aspect 93, further including: means for receiving an indication of a capability of the passive wireless device associated with the interference avoidance for the backscattered communications, where the communications signature is associated with the capability of the passive wireless device.

Aspect 95: The apparatus of any of aspects 93-94, where the means for transmitting the indication of the communications signature include: means for transmitting an indication of a time domain code sequence of the passive wireless device, where the communications signature includes the time domain code sequence of the passive wireless device.

Aspect 96: The apparatus of aspect 95, where the means for transmitting the message in accordance with the communications signature include: means for transmitting a set of multiple repetitions of the message, where the time domain code sequence is associated with a sequence of elements, and where a respective element of the sequence of elements is applied to each successive repetition of the set of multiple repetitions of the message.

Aspect 97: The apparatus of any of aspects 95-96, where the time domain code sequence is an OCC sequence, a non-OCC sequence, or an asynchronous code sequence, and the time domain code sequence is applied per bit, per group of bits, or per response from the passive wireless device.

Aspect 98: The apparatus of any of aspects 93-97, where the means for transmitting the indication of the communications signature include: means for transmitting an indication of a power scaling factor of the passive wireless device, where the communications signature includes the power scaling factor of the passive wireless device.

Aspect 99: The apparatus of aspect 98, where the power scaling factor is associated with a first priority or a first QoS associated with the passive wireless device, or associated with a second priority or a second QoS associated with the message.

Aspect 100: The apparatus of any of aspects 93-99, where the means for transmitting the indication of the communications signature include: means for transmitting an indication of a bandwidth associated with the message, where a frequency domain filtering of the backscattered communications from the passive wireless device is associated with the indication of the bandwidth.

Aspect 101: The apparatus of any of aspects 93-100, where the means for transmitting the indication of the communications signature include: means for transmitting an indication of a power scaling factor of the source device, where the communications signature includes the power scaling factor of the source device, and where the power scaling factor of the source device is used in accordance with one or more other wireless devices using a same sub-channel as a sub-channel used by the source device and the reader device.

Aspect 102: The apparatus of aspect 101, where the power scaling factor of the source device is associated with the sub-channel used by the source device and the reader device, a first set of distances between the reader device and the one or more other wireless devices, a second set of distances between the passive wireless device and the one or more other wireless devices, or a transmit power used by the one or more other wireless devices, or any combination thereof.

Aspect 103: The apparatus of any of aspects 93-102, further including: means for measuring that a first set of sub-channels are occupied in accordance with an energy detection measurement at the reader device; and means for selecting, from a second set of sub-channels, a sub-channel for the backscattered communications from the source device to the reader device via the passive wireless device, where the second set of sub-channels is associated with the first set of sub-channels in accordance with a mapping relationship between occupied sub-channels and available sub-channels.

Aspect 104: A non-transitory computer-readable medium storing code for wireless communication at a passive wireless device, the code including instructions executable by a processor to: receive an indication of a communications signature, from a set of communications signatures, that is specific to backscattered communications from a source device to a reader device via the passive wireless device, where the communications signature is associated with interference avoidance for the backscattered communications; receive a first message from the source device; and transmit, to the reader device, a second message via a backscattering of the first message and in accordance with the communications signature.

Aspect 105: The non-transitory computer-readable medium of aspect 104, where the instructions to receive the indication of the communications signature are executable by the processor to: receive an indication of a time domain code sequence, where the communications signature includes the time domain code sequence.

Aspect 106: A non-transitory computer-readable medium storing code for wireless communication at a reader device, the code including instructions executable by a processor to: receive an indication of a communications signature, from a set of communications signatures, that is specific to backscattered communications from a source device to the reader device via a passive wireless device, where the communications signature is associated with interference avoidance for the backscattered communications; and receive, via a backscattering from the passive wireless device, a message in accordance with the communications signature.

Aspect 107: A non-transitory computer-readable medium storing code for wireless communication at a source device, the code including instructions executable by a processor to: transmit an indication of a communications signature, from a set of communications signatures, that is specific to backscattered communications from the source device to a reader device via a passive wireless device, where the communications signature is associated with interference avoidance for the backscattered communications; and transmit, to the reader device via a backscattering from the passive wireless device, a message in accordance with the communications signature.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, and the like. Also, "determining" can include receiving (such as receiving information), accessing (such as accessing data stored in memory) and the like. Also, "determining" can include resolving, selecting, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented using hardware or software depends upon the particular application and design constraints imposed on the overall system.

The hardware and data processing apparatus used to implement the various illustrative logics, logical blocks, modules and circuits described in connection with the aspects disclosed herein may be implemented or performed using a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented using hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted using one or more instructions or code of a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one location to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc. Disks may reproduce data magnetically and discs may reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. A passive wireless device, comprising:

a processing system comprising one or more processors and one or more memories, the processing system configured to cause the passive wireless device to:

receive an indication of a communications signature, from a set of communications signatures, that is specific to backscattered communications from a source device to a reader device via the passive wireless device, wherein the communications signature is associated with interference avoidance for the backscattered communications;

receive a first message from the source device; and transmit, to the reader device, a second message via a backscattering of the first message and in accordance with the communications signature.

2. The passive wireless device of claim 1, wherein the processing system is further configured to cause the passive wireless device to:

transmit an indication of a capability of the passive wireless device associated with the interference avoidance for the backscattered communications, wherein the communications signature is associated with the capability of the passive wireless device.

3. The passive wireless device of claim 1, wherein, to receive the indication of the communications signature, the processing system is further configured to cause the passive wireless device to:

receive an indication of a time domain code sequence, wherein the communications signature includes the time domain code sequence.

4. The passive wireless device of claim 3, wherein, to transmit the second message via the backscattering of the first message and in accordance with the communications signature, the processing system is further configured to cause the passive wireless device to:

apply the time domain code sequence to a plurality of repetitions of the first message, wherein the time domain code sequence is associated with a sequence of elements, and wherein a respective element of the sequence of elements is applied to each successive repetition of the plurality of repetitions of the first message.

5. The passive wireless device of claim 4, wherein the time domain code sequence is an orthogonal cover code (OCC) sequence, a non-OCC sequence, or an asynchronous code sequence, and wherein the time domain code sequence is applied per bit, per group of bits, or per response from the passive wireless device.

6. The passive wireless device of claim 1, wherein, to receive the indication of the communications signature, the processing system is further configured to cause the passive wireless device to:

receive an indication of a power scaling factor, wherein the communications signature includes the power scaling factor.

7. The passive wireless device of claim 6, wherein, to transmit the second message via the backscattering of the first message and in accordance with the communications signature, the processing system is further configured to cause the passive wireless device to:

apply the power scaling factor to the second message, wherein the communications signature includes the power scaling factor, wherein the power scaling factor is associated with a first priority or a first quality of service (QoS) associated with the passive wireless device, or associated with a second priority or a second QoS associated with the first message.

8. The passive wireless device of claim 1, wherein the processing system is further configured to cause the passive wireless device to:

receive an indication of a bandwidth associated with the first message, wherein a frequency domain filtering of the backscattered communications from the passive wireless device is associated with the indication of the bandwidth;

perform energy harvesting using first radio frequency energy received within the bandwidth associated with the first message and using second radio frequency energy received outside of the bandwidth associated with the first message; and filter the second radio frequency energy received outside of the bandwidth associated with the first message to focus the backscattering of the first message to the bandwidth associated with the first message.

9. A reader device, comprising:

a processing system comprising one or more processors and one or more memories, the processing system configured to cause the reader device to:

receive an indication of a communications signature, from a set of communications signatures, that is specific to backscattered communications from a source device to the reader device via a passive wireless device, wherein the communications signature is associated with interference avoidance for the backscattered communications; and receive, via a backscattering from the passive wireless device, a message in accordance with the communications signature.

10. The reader device of claim 9, wherein, to receive the indication of the communications signature, the processing system is further configured to cause the reader device to:

receive an indication of a time domain code sequence of the passive wireless device, wherein the communications signature includes the time domain code sequence of the passive wireless device.

11. The reader device of claim 10, wherein, to receive the message via the backscattering from the passive wireless device and in accordance with the communications signature, the processing system is further configured to cause the reader device to:

receive radio frequency signaling associated with a plurality of repetitions of a set of messages, the plurality of repetitions of the set of messages including a respective plurality of repetitions for each of the set of messages, wherein the set of messages includes the message; and extract the message from the radio frequency signaling in accordance with the time domain code sequence.

12. The reader device of claim 11, to extract the message from the radio frequency signaling, the processing system is further configured to cause the reader device to:

multiply each of the plurality of repetitions of the set of messages by a conjugate of the time domain code sequence to obtain a plurality of products; and add the plurality of products together to obtain the message.

13. The reader device of claim 11, wherein each message of the set of messages is associated with reflected signaling from a different passive wireless device, wherein each passive wireless device is associated with a different time domain code sequence, wherein the time domain code sequence is an orthogonal cover code (OCC) sequence, a non-OCC sequence, or an asynchronous code sequence, and wherein the time domain code sequence is applied per bit, per group of bits, or per response from the passive wireless device.

14. The reader device of claim 9, wherein, to receive the indication of the communications signature, the processing system is further configured to cause the reader device to:

receive an indication of a power scaling factor of the passive wireless device, wherein the communications signature includes the power scaling factor of the passive wireless device.

15. The reader device of claim 14, wherein, to receive the message via the backscattering from the passive wireless device and in accordance with the communications signature, the processing system is further configured to cause the reader device to:

receive radio frequency signaling associated with a set of messages, wherein the set of messages includes the message, wherein each message of the set of messages is associated with reflected signaling from a different passive wireless device, and wherein each passive wireless device is associated with a different power scaling factor; and extract the message from the radio frequency signaling in accordance with a successive cancellation technique associated with the power scaling factor.

16. The reader device of claim 9, wherein, to receive the indication of the communications signature, the processing system is further configured to cause the reader device to:

receive an indication of a power scaling factor of the source device, wherein the communications signature includes the power scaling factor of the source device, wherein the power scaling factor of the source device is used in accordance with one or more other wireless devices using a same sub-channel as a sub-channel used by the source device and the reader device, and wherein the power scaling factor of the source device is associated with the sub-channel used by the source device and the reader device, a first set of distances between the reader device and the one or more other wireless devices, a second set of distances between the passive wireless device and the one or more other wireless devices, or a transmit power used by the one or more other wireless devices, or any combination thereof.

17. A source device, comprising:

a processing system comprising one or more processors and one or more memories, the processing system configured to cause the source device to:

transmit an indication of a communications signature, from a set of communications signatures, that is specific to backscattered communications from the source device to a reader device via a passive wireless device, wherein the communications signature is associated with interference avoidance for the backscattered communications; and transmit, to the reader device via a backscattering from the passive wireless device, a message in accordance with the communications signature.

18. The source device of claim 17, wherein the processing system is further configured to cause the source device to:

receive an indication of a capability of the passive wireless device associated with the interference avoidance for the backscattered communications, wherein the communications signature is associated with the capability of the passive wireless device.

19. The source device of claim 17, wherein, to transmit the indication of the communications signature, the processing system is further configured to cause the source device to:

transmit an indication of a time domain code sequence of the passive wireless device, wherein the communications signature includes the time domain code sequence of the passive wireless device.

20. The source device of claim 19, wherein, to transmit the message in accordance with the communications signature, the processing system is further configured to cause the source device to:

transmit a plurality of repetitions of the message, wherein the time domain code sequence is associated with a sequence of elements, and wherein a respective element of the sequence of elements is applied to each successive repetition of the plurality of repetitions of the message.

* * * * *